United States Patent [19]
Prevorsek et al.

[11] Patent Number: 5,677,029
[45] Date of Patent: Oct. 14, 1997

[54] BALLISTIC RESISTANT FABRIC ARTICLES

[75] Inventors: Dusan C. Prevorsek; Gary A. Harpell, both of Morristown; David Wertz, Princeton, all of N.J.

[73] Assignee: AlliedSignal Inc., Morristown, N.J.

[21] Appl. No.: 764,033

[22] Filed: Dec. 12, 1996

Related U.S. Application Data

[63] Continuation of Ser. No. 520,327, Aug. 28, 1995, abandoned, which is a continuation of Ser. No. 615,840, Nov. 19, 1990, abandoned.

[51] Int. Cl.$^6$ ........................................ B32B 5/12
[52] U.S. Cl. ............... 428/113; 428/105; 428/109; 428/111; 428/114; 428/902; 428/911; 442/236; 442/394
[58] Field of Search ...................... 442/236, 394; 428/109, 111, 113, 114, 902, 911, 105

[56] References Cited

U.S. PATENT DOCUMENTS

| | | | |
|---|---|---|---|
| 4,623,574 | 11/1986 | Harpell et al. | 428/911 |
| 4,650,710 | 3/1987 | Harpell et al. | 428/911 |
| 4,678,702 | 7/1987 | Lancaster et al. | 428/911 |
| 4,810,559 | 3/1989 | Fortier et al. | 428/911 |
| 4,820,568 | 4/1989 | Harpell et al. | 428/911 |
| 4,868,040 | 9/1989 | Hallal et al. | 428/911 |
| 4,883,700 | 11/1989 | Harpell et al. | 428/911 |
| 4,916,000 | 4/1990 | Li et al. | 428/911 |
| 4,953,234 | 9/1990 | Li et al. | 428/911 |

*Primary Examiner*—James J. Bell
*Attorney, Agent, or Firm*—Melanie L. Brown; Roger H. Criss

[57] ABSTRACT

A flexible article of manufacture especially suitable for use as a ballistic resistant body armor which comprises two or more layers, at least one of said layers being a fibrous layer, and at least one of said layers being a polymeric layer in contact with and bound to all or portion of said fibrous layer.

70 Claims, 7 Drawing Sheets

BALLISTIC RESISTANT FABRIC ARTICLES

This application is a continuation of application Ser. No. 08/520,327 filed Aug. 28, 1995 (abandoned) which is a continuation of Ser. No. 07/615,840 filed Nov. 19, 1990 (abandoned).

BACKGROUND OF THE INVENTION

1. Field of the Invention

This invention relates to ballistic resistant fabric articles. More particularly, this invention relates to flexible ballistic resistant articles having improved ballistic protection.

2. Prior Art

Ballistic articles such as bulletproof vests, helmets, structural members of helicopters and other military equipment, vehicle panels, briefcases, raincoats and umbrellas containing high strength fibers are known. Fibers conventionally used include aramide fibers such as poly(phenylenediamine terephthalamide), graphite fibers, nylon fibers, ceramic fibers, glass fibers and the like. For many applications, such as vests or parts of vests, the fibers are used in a woven or knitted fabric. For many of the applications, the fibers are encapsulated or embedded in a matrix material.

U.S. Pat. Nos. 4,623,574 and 4,748,064 disclose a simple composite structure comprising high strength fibers embedded in an elastomeric matrix. The simple composite structure exhibits outstanding ballistic protection as compared to simple composites utilizing rigid matrices, the results of which are disclosed in the patents. Particularly effective are simple composites employing ultra-high molecular weight polyethylene and polypropylene such as disclosed in U.S. Pat. No. 4,413,110.

U.S. Pat. Nos. 4,737,402 and 4,613,535 disclose complex rigid composite articles having improved impact resistance which comprise a network of high strength fibers such as the ultra-high molecular weight polyethylene and polypropylene disclosed in U.S. Pat. No. 4,413,110 embedded in an elastomeric matrix material and at least one additional rigid layer on a major surface of the fibers in the matrix. It is disclosed that the composites have improved resistance to environmental hazards, improved impact resistance and are unexpectedly effective as ballistic resistant articles such as armor.

U.S. Pat. No. 4,650,710 discloses a ballistic resistant fabric article which comprises at least one network of fibers selected from the group consisting of extended chain polyethylene, polypropylene, polyvinyl alcohol and polyacrylonitrile fibers coated with a low modulus elastomeric material.

U.S. Pat. No. 4,650,710 discloses a flexible article of manufacture comprising a plurality of first flexible layers arranged in a first portion of the article, each of said first layers consisting essentially of fibers having a tensile modulus of at least about 300 g/denier and a tenacity of at least about 15 g/denier and a plurality of second flexible layers arranged in a second portion of said article, each of said second flexible layers comprising fibers, the resistance to displacement of fibers in each of said second flexible layers being greater than the resistance to displacement in each of said first flexible layers.

Other ballistic resistant articles are described in U.S. Pat. Nos. 4,916,000; 4,403,012, 4,457,985; 4,737,401; 4,543,286; 4,563,392 and 4,501,856.

SUMMARY OF THE INVENTION

The present invention provides a flexible article of manufacture comprising two or more layers, at least one of said layers being a fibrous layer comprised of a network of fibers and at least one of said layers being a polymeric layer comprising a thermoplastic, a thermosetting resin or a combination thereof in contact with and bound to the fibers at all or a portion of a major surface of said fibrous layer.

Several advantages flow from this invention. For example, the article of this invention exhibits relatively improved penetration resistance as compared to fibrous articles of the same areal density without unduly affecting the flexibility of the article adversely. Moreover, for the article of this invention minimal loss in puncture resistance when wet as compared to conventional puncture resistant fibers. Through use of this invention, relatively higher denlet yarn can be employed in the manufacture of articles of this invention without unduly affecting the penetration resistance of the article.

BRIEF DESCRIPTION OF THE DRAWINGS

The invention will be more fully understood and further advantages will become apparent when reference is made to the following detailed description of the invention and the accompanying drawings in which.

DETAILED DESCRIPTION OF THE PREFERRED EMBODIMENTS OF THE INVENTION

The preferred invention will be better understood by those of skill in the art by reference to the above figures. The preferred embodiments of this invention illustrated in the figures are not intended to be exhaustive or to limit the invention to the precise form disclosed. It is chosen to describe or to best explain the principles of the invention and its application and practical use to thereby enable others skilled in the art to best utilize the invention.

In its broadest aspects, the invention is directed to a multilayered fiber containing article of manufacture comprising at least two layers, one of which is a fibrous layer and the other of which is a polymeric layer which is attached to and bound to a surface of the fibrous layer. The article of this invention exhibits improved penetration resistance when impacted by a projectile, without adversely affecting the flexibility of the article to an undue extent.

As used herein, the "penetration resistance" of the article is the resistance to penetration by a designated threat, as for example, a bullet, an ice pick, a knife or the like. The penetration resistance can be expressed as the ratio of peak force (F) for designated threat (projectile, velocity, and other threat parameters known to those of skill in the art to effect peak force) divided by the areal density (ADT) of the target. As used herein, the "peak force", is the maximum force exerted by a threat to penetrate a designated target using a model 1331 high speed Instron high speed tester having an impact velocity of about 12 ft/S (3.66 m/s) and where the target strike face area has a diameter of 3 in. (7.6 cm) (See the example 4); and as used herein, the "areal density" or "ADT" is the ratio of the total target weight to the area of the target strike face.

The flexibility of the articles of the present invention can be demonstrated by clamping a 30 cm square sample of the article horizontally along one side edge with an overhang of 20 cm, and measuring the amount of drape of the article (the amount of drape being measured by the distance between the level of the clamped side edge and the opposite edge). For flexible articles of this invention, the amount of drape is ordinarily at least about 8 cm, preferably at least about 10 cm, more preferably at least about 13 cm and most preferably at least about 17 cm.

Figure 1:
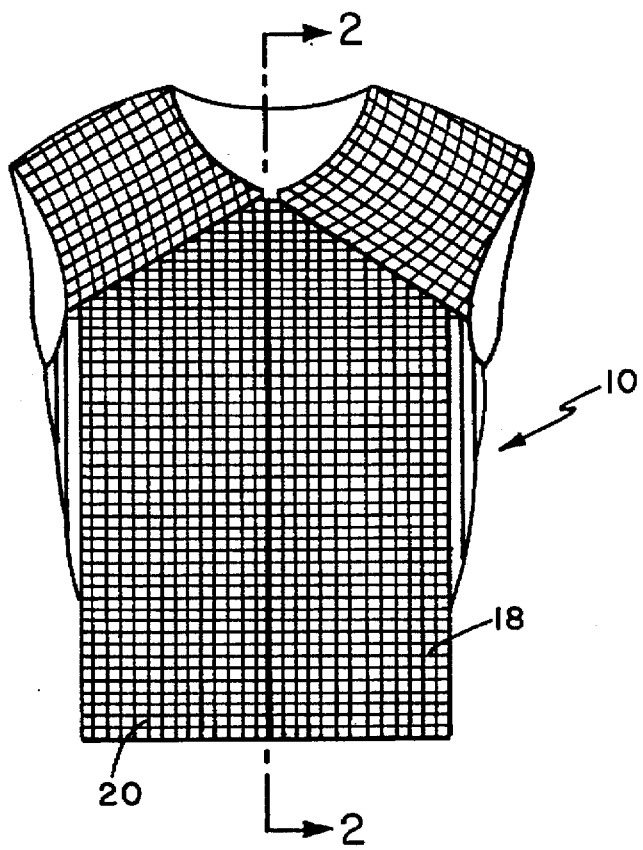
FIG. 1 is a front perspective view of a preferred embodiment of the article of this invention.
Figure 2:
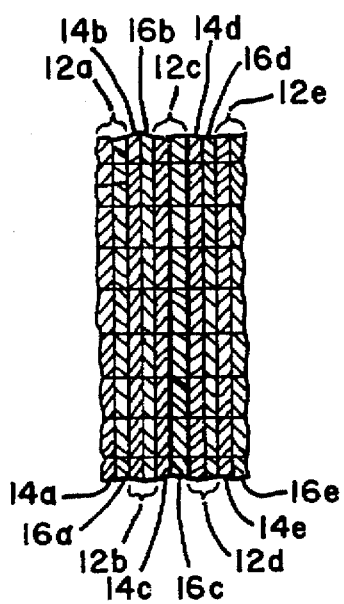
FIG. 2 is a cross-sectional view of the preferred embodiments of this invention of FIG. 1 taken along line 2—2.
Figure 3:
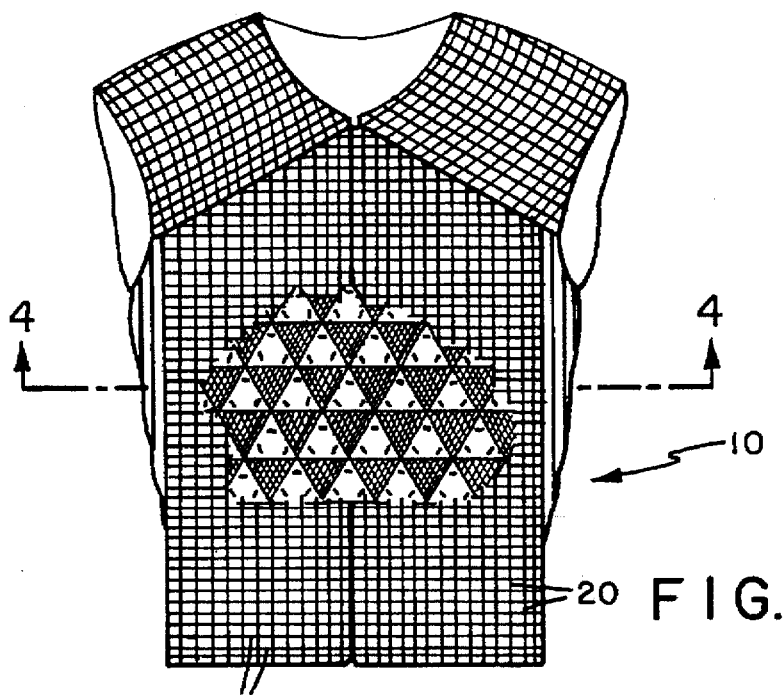
FIG. 3 is a front perspective view of another embodiment of this invention similar to that of the embodiment of FIG. 1 having certain selected components cut away for purpose of illustration showing a plurality rigid ballistic resistant elements.

Referring to FIGS. 1, 2 and 3, the numeral 10 indicates a ballistic resistant article 10, which in this preferred embodiment of the invention is ballistic resistant body armor. As depicted in FIG. 2, article 10 is comprised of four layers 12a to 12e. Layers 12a includes two layers fibrous layers 14a and polymeric layer 16a, layer 12b includes layers 14b and 16b, layer 12c includes two layers, 14c and 16c, layer 12d includes two layers 14d and 16d and layer 12e includes two layers 14e and 16e. However, the number of layers 12, layers 14 and layers 16 included in article 10 may vary widely, provided that the article includes at least one layer 12, and further provided that layer 12 includes at least one layer 14 and one layer 16. In general, the number of layers in any embodiment will vary depending on the degree of penetration resistance and flexibility desired. The number layers 12 is preferably from 1 to about 70, more preferably from about 2 to about 60 and most preferably from about 20 to about 50.

As shown in FIGS. 1, 2, 3 and 4 layers 12 are forming the various secured together by horizontal securing means 18 and vertical securing means 20. In the illustrative embodiments of the invention depicted in the figures securing means is stitching; however, any conventional securing means may be used including but not limited to bolts, rivets, adhesive, staples, stitches, and the like. While in the embodiment of the figures all layers 12 are secured together, it is contemplated that the number of layers 12 secured together may be as few as two, or any number of layers 12 in article 10 in any combination. In the preferred embodiments of the invention where the number of layers 14 is more than about 20, all the layers are not secured together. In these embodiments, from about 2 to about 20 layers, preferably from 2 to about 12 layers, more preferably from about 2 to about 10 layers and most preferably from about 2 to about 8 are secured together forming a plurality of packets (not depicted). These packets forming various fibrous layers 12 may in turn be secured together by a conventional securing means as described above.

In the preferred embodiments of the invention depicted in FIGS. 1 and 2, stitches 18 and 20 are utilized to secure layers 12. The type of stitching employed may vary widely. Stitching and sewing methods such as lock stitching, chain stitching, zig-zag stitching and the like are illustrative of the type of stitching for use in this invention. An important feature of this invention is the tensile properties of the fiber used in stitching means 14 and 16. It has been found that a relatively high modulus (equal to or greater than about 200 grams/denier) and a relatively high tenacity (equal to or greater than about 5 grams/denier) fiber is essential for the beneficial effects of the invention. All tensile properties are evaluated by pulling a 10 in (25.4 cm) fiber length clamped in barrel clamps at a rate of 10 in/min (25.4 cm/min) on an Instron Tensile Tester. In the preferred embodiments of the invention, the tensile modulus is from about 400 to about 3000 grams/denier and the tenacity is from about 20 to about 50 grams/denier, more preferably the tensile modulus is from about 1000 to about 3000 grams/denier and the tenacity is from about 25 to about 50 grams/denier and most preferably the tensile modulus is from about 1500 to about 3000 grams/denier and the tenacity is from about 30 to about 50 grams/denier.

Figure 14:
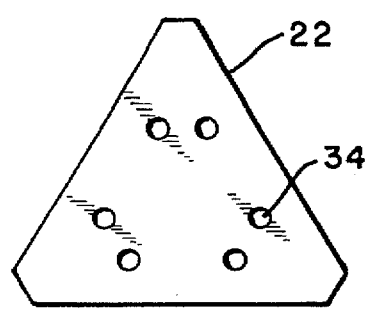
FIG. 14 is a frontal view of a truncated equilateral triangle.

Useful threads and fibers may vary widely and will be described in more detail herein below in the discussion of fiber for use in the fabrication of fibrous layers 12. However, the thread or fiber used in stitching means 14 and 16 is preferably an aramid fiber or thread (as for example Kevlar® 29, 49, 129 and 149 aramid fibers), an extended chain polyethylene thread or fiber (as for example Spectra® 900 and Spectra® 1000 polyethylene fibers) or a mixture thereof. Each of layers 12a to 12d comprises fibrous layers 14a ti 14d formed from a network of fibers and polymeric layers 16a to 16d. Fibrous layer 14 may be laminated or bonded to polymeric layer 16 by the polymer in polymeric layer 16 or through use of an adhesive or the like. In addition to bonding, polymeric layer 16 and fibrous layer 14 may be secured together using conventional securing means as described above. For example, in the preferred embodiment of the invention where the article includes planar bodies 22, the bodies 22 are stitched to fibrous layer 14. In the most preferred embodiment, bodies 22 are bonded to fibrous layer 14 away from the edges of bodies 22, and bodies 22 then are stitched to the fibrous layer 14 at about the bonded region, preferably at and about all or a portion of the outer boundary of the bonded areas and most preferably near the boundaries of each of the bodies 18 a distance from the edges of bodies 18 to provide from improved flexibility as depicted in FIG. 14 by allowing layers 12 to flex away from bodies 18 between the attachment point and the body parameter.

The combined areal density of fibrous layer(s) 14 and polymeric layer(s) 16 may vary widely. In general, for ballistic body armor applications, the areal density is equal to or less than about 12 kg/m². In the preferred embodiments of the invention, the areal density is equal to or less than about 7 kg/m², and in the more preferred embodiments of the invention, the areal density is from about 3 to about 6.5 kg/m₂. In the most preferred embodiments of the invention, the areal density is from about 3.5 to about 6.2 kg/m².

The weight percents of fibrous layers 14 and polymeric layers 16 in article 10 may vary widely. In general, the weight percent of fibrous layer 14 may vary from about 1 to about 99 weight percent, and the weight percent of polymeric layer 16 may vary from about 1 to about 99 based on the total weight of article 10. In the preferred embodiments of the invention, the weight percent of fibrous layers 14 may vary from about 50 to about 99 weight percent, and the weight percent of the polymeric layers 16 vary from about 1 to about 50 weight percent based on the total weight of article 10. In the more preferred embodiments of the invention, the weight percent of fibrous layers 14 may vary from about 85 to about 98 weight percent and the weight percent of polymeric layers 16 vary from about 2 to about 15 weight percent based on the total weight of article 10, and in the most preferred embodiments of the invention, the weight percent of fibrous layers 14 may vary from about 90 to about 96 weight percent. Polymeric layers 16 vary from about 4 to about 10 weight percent on the aforementioned basis.

Fibrous layer 14 comprises a network of fibers. For purposes of the present invention, fiber is defined as an elongated body, the length dimension of which is much greater than the dimensions of width and thickness. Accordingly, the term fiber as used herein includes a monofilament elongated body, a multifilament elongated body, ribbon, strip, and the like having regular or irregular cross sections. The term fibers includes a plurality of any one or combination of the above.

The cross-section of fibers for use in this invention may vary widely. Useful fibers may have a circular cross-section, oblong cross-section or irregular or regular multi-lobal cross-section having one or more regular or irregular lobes projecting from the linear or longitudinal axis of the fibers. In the particularly preferred embodiments of the invention, the fibers are of substantially circular or oblong cross-section and in the most preferred embodiments are of circular or substantially circular cross-section.

Fibrous layer 14 may be formed from fibers alone, or from fibers coated with a suitable polymer, as for example, a polyolefin, polyamide, polyester, polydiene such as a polybutadiene, urethanes, diene/olefin copolymers such as poly(styrene-butadiene-styrene) block copolymers, and a wide variety of elastomers. Fibrous layer 14 may also comprise a network of a fibrous dispersed in a polymeric matrix as for example a matrix of one or more of the above referenced polymers to form a flexible composite as described in more detail in U.S. Pat. Nos. 4,623,574; 4,748,064; 4,916,000; 4,403,012; 4,457,985; 4,650,710; 4,681,792; 4,737,401; 4,543,286; 4,563,392; and 4,501,856. Regardless of the construction, fibrous layer 14 is such that article 10 has the required degree of flexibility.

The fibers in fibrous layer 14 may be arranged in networks having various configurations. For example, a plurality of filaments can be grouped together to form twisted or untwisted yarn bundles in various alignments. The filaments or yarn may be formed as a felt, knitted or woven (plain, basket, satin and crow feet weaves, etc.) into a network, fabricated into non-woven fabric, arranged in parallel array, layered, or formed into a woven fabric by any of a variety of conventional techniques. Among these techniques, for ballistic resistance applications we prefer to use those variations commonly employed in the preparation of aramide fabrics for ballistic-resistant articles. For example, the techniques described in U.S. Pat. No. 4,181,768 and in M. R. Silyguist et al., *J. Macromol Sci. Chem.*, A7(1), pp. 203 et. seq. (1973) are particularly suitable.

The construction of fibrous layer 14 also influences the resistance to displacement of the fibers in the layer. By fiber layer construction, we consider such features as, for example, consolidated v. non-consolidated layers, heat set v. non-heat set layers, twisted fiber v. non-twisted fiber-containing layers, woven v. non-woven layer, weave type and density, and fiber density. As general rules, when comparing fiber of substantially the same geometry and properties, consolidated layers exhibit increased resistance to fiber displacement as compared to non-consolidated layers; heat set layers exhibit increase resistance to fiber displacement as compared to non-heat set layers; woven layers exhibit a higher resistance to fiber displacement as compared to non-woven layers; as between woven layers, the weave type influences the resistance to fiber displacement with layers having a plain weave having a greater resistance than basket weave which has a greater resistance than satin weave; and directly related to the weave type is weave density within a given type of weave, wherein the greater the density of the weave, the greater the resistance to displacement of fibers in the woven layer.

The type of fibers used in the fabrication of fibrous layer 14 may vary widely and is preferably organic or inorganic fibers having a tensile strength of at least about 5 grams/denier, a tensile modulus of at least about 30 grams/denier and an energy-to-break of at least about 20 joules/gram. The tensile properties are measured by an Instron tensile testing machine by pulling a 10 in. (25.4 cm) length of fiber clamped in barrel clamps at a rate of 10 in./min. (25.4 cm/min). Preferred fibers for use in the practice of this invention are those having a tenacity equal to or greater than about 10 g/d (as measured by an Instron Tensile Testing Machine), a tensile modulus equal to or greater than about 150 g/d (as measured by an Instron Tensile Testing Machine) and an energy-to-break equal to or greater than about 8 joules/gram. Particularly preferred fibers are those having a tenacity equal to or greater than about 20 g/d, a tensile modulus equal to or greater than about 500 g/d and energy-to-break equal to or greater than about 30 joules/grams. Amongst these particularly preferred embodiments, most preferred are those embodiments in which the tenacity of the fibers are equal to or greater than about 25 g/d, the tensile modulus is equal to or greater than about 1000 g/d, and the energy-to-break is equal to or greater than about 35 joules/grams. In the practice of this invention, fibers of choice have a tenacity equal to or greater than about 30 g/d, the tensile modulus is equal to or greater than about 1300 g/d and the energy-to-break is equal to or greater than about 40 joules/grams.

The denier of the fiber may vary widely. In general, fiber denier is equal to or less than about 4000. In the preferred embodiments of the invention, fiber denier is from about 10 to about 4000, the more preferred embodiments of the invention fiber denier is from about 10 to about 1000 and in the most preferred embodiments of the invention, fiber denier is from about 10 to about 400.

Useful inorganic fibers include S-glass fibers, E-glass fibers, carbon fibers, boron fibers, alumina fibers, zirconia-silica fibers, alumina-silica fibers and the like.

Illustrative of useful organic fibers are those composed of thermosetting resins, thermoplastics polymers and mixture thereof such as polyesters, polyolefins, polyetheramides, fluoropolymers, polyethers, celluloses, phenolics, polyesteramides, polyurethanes, epoxies, aminoplastics, polysulfones, polyetherketones, polyetheretherketones, polyesterimides, polyphenylene sulfides, polyether acryl ketones, poly(amideimides), and polyimides. Illustrative of other useful organic fibers are those composed of aramids (aromatic polyamides), such as poly(m-xylylene adipamide), poly(p-xylylene sebacamide), poly 2,2,2-trimethylhexamethylene terephthalamide), poly(piperazine sebacamide), poly(metaphenylene isophthalamide) (Nomex®) and poly(p-phenylene terephthalamide) (Kevlar®); aliphatic and cycloaliphatic polyamides, such as the copolyamide of 30% hexamethylene diammonium isophthalate and 70% hexamethylene diammonium adipate, the copolyamide of up to 30% bis-(-amidocyclohexyl) methylene, terephthalic acid and caprolactam, polyhexamethylene adipamide (nylon 66), poly(butyrolactam) (nylon 4), poly (9-aminonoanoic acid) (nylon 9), poly (enantholactam) (nylon 7), poly(capryllactam) (nylon 8), polycaprolactam (nylon 6), poly(p-phenylene terephthalamide), polyhexamethylene sebacamide (nylon 6,10), polyaminoundecanamide (nylon 11), polydodeconolactam (nylon 12), polyhexamethylene isophthalamide, polyhexamethylene terephthalamide, polycaproamide, poly (nonamethylene azelamide) (nylon 9,9), poly (decamethylene azelamide) (nylon 10,9), poly (decamethylene sebacamide) (nylon 10,10), poly[bis-(4-aminocyclothexyl)methane 1,10-decanedicarboxamide] (Qiana) (trans), or combination thereof; and aliphatic, cycloaliphatic and aromatic polyesters such as poly(1,4-cyclohexlidene dimethyl eneterephathalate) cis and trans, poly(ethylene-1,5-naphthalate), poly(ethylene-2,6-naphthalate), poly(1,4-cyclohexane dimethylene terephthalate) (trans), poly(decamethylene terephthalate), poly(ethylene terephthalate), poly(ethylene isophthalate), poly(ethylene oxybenozoate), poly(para-hydroxy benzoate), poly(dimethylpropiolactone), poly(decamethylene adipate), poly(ethylene succinate), poly(ethylene azelate), poly (decamethylene sebacate), poly(β,β-dimethyl-propiolactone), and the like.

Also illustrative of useful organic fibers are those of liquid crystalline polymers such as lyotropic liquid crystalline polymers which include polypeptides such as polyδ-benzyl L-glutamate and the like; aromatic polyamides such as poly(1,4-benzamide), poly(chloro-1,4-phenylene terephthalamide), poly(1,4-phenylene fumaramide), poly (chloro-1,4-phenylene fumaramide), poly(4,4'-benzanilide trans, trans-muconamide), poly(1,4-phenylene mesaconamide), poly(1,4-phenylene) (trans-1,4-cyclohexylene amide), poly(chloro-1,4-phenylene) (trans-1,4-cyclohexylene amide), poly(1,4-phenylene 1,4-dimethyl-trans-1,4-cyclohexylene amide), poly(1,4-phenylene 2.5-pyridine amide), poly(chloro-1,4-phenylene 2.5-pyridine amide), poly(3,3'-dimethyl-4,4'-biphenylene 2.5 pyridine amide), poly(1,4-phenylene 4,4'-stilbene amide), poly (chloro-1,4-phenylene 4,4'-stilbene amide), poly(1,4-phenylene 4,4'-azobenzene amide), poly(4,4'-azobenzene 4,4'-azobenzene amide), poly(1,4'-phenylene 4,4'-azoxybenzene amide), poly(4,4'-azobenzene 4,4'-azoxybenzene amide), poly(1,4-cyclohexylene 4,4'-azobenzene amide), poly(4,4'-azobenzene terephthal amide), poly(3.8-phenanthridinone terephthal amide), poly (4,4'-biphenylene terephthal amide), poly(4,4'-biphenylene 4,4'-bibenzo amide), poly(1,4-phenylene 4,4'-bibenzo amide), poly(1,4-phenylene 4,4'-terephenylene amide), poly (1,4-phenylene 2,6-naphthal amide), poly(1,5-naphthylene terephthal amide), poly(3,3'-dimethyl-4,4-biphenylene terephthal amide), poly(3,3'-dimethoxy-4,4'-biphenylene terephthal amide), poly(3,3'-dimethoxy-4,4-biphenylene 4,4'-bibenzo amide) and the like; polyoxamides such as those derived from 2,2'dimethyl-4,4'diamino biphenyl and chloro-1,4-phenylene diamine; polyhydrazides such as poly chloroterephthalic hydrazide, 2,5-pyridine dicarboxylic acid hydrazide) poly(terephthalic hydrazide), poly(terephthalic-chloroterephthalic hydrazide) and the like; poly(amide-hydrazides) such as poly(terephthaloyl 1,4 amino-benzhydrazide) and those prepared from 4-amino-benzhydrazide, oxalic dihydrazide, terephthalic dihydrazide and para-aromatic diacid chlorides; polyesters such as those of the compositions include poly(oxy-trans-1,4-cyclohexyleneoxycarbonyl-trans-1,4-cyclohexylenecarbonyl-β-oxy-1,4-phenyl-eneoxyterephthaloyl) and poly(oxy-cis-1,4-cyclohexyleneoxycarbonyl-trans-1,4-cyclohexylenecarbonyl-β-oxy-1,4-phenyleneoxyterephthaloyl) in methylene chloride-o-cresol poly[(oxy-trans-1,4-cyclohexylene-oxycarbonyl-trans-1,4-cyclohexylenecarbonyl-β-oxy-(2-methyl-1,4-phenylene) oxy-terephthaloyl)] in 1,1,2,2-tetrachloroethane-o-chlorophenol-phenol (60:25:15 vol/vol/vol), poly[oxy-trans-1,4-cyclohexyleneoxycarbonyl-trans-1,4-cyclohexylenecarbonyl-β-oxy(2-methyl-1,3-phenylene) oxy-terephthaloyl] in o-chlorophenol and the like; polyazomethines such as those prepared from 4,4'-diaminobenzanilide and terephthalaldephide, methyl-1,4-phenylenediamine and terephthalaldelyde and the like; poly-isocyanides such as poly(-phenyl ethyl isocyanide), poly(n-octyl isocyanide) and the like; polyisocyanates such as poly(n-alkyl isocyanates) as for example poly(n-butyl isocyanate), poly(n-hexyl isocyanate) and the like; lyrotropic crystalline polymers with heterocylic units such as poly(1,4-phenylene-2,6-benzobisthiazole) (PBT), poly(1,4-phenylene-2,6-benzobisoxazole) (PBO), poly(1,4-phenylene-1,3,4-oxadiazole), poly(1,4-phenylene-2,6-benzobisimidazole), poly[2,5(6)-benzimidazole] (AB-PBI), poly[2,6-(1,4-phneylene)-4-phenylquinoline], poly[1,1'-(4, 4'-biphenylene)-6,6'-bis(4-phenylquinoline)] and the like; polyorganophosphazines such as polyphosphazine, polybisphenoxyphosphazine, poly[bis(2,2, 2'trifluoroethyelene)phosphazine] and the like; metal polymers such as those derived by condensation of trans-bis(tri-n-butylphosphine)platinum dichloride with a bisacetylene or trans-bis(tri-n-butylphosphine)bis(1,4-butadinynyl) platinum and similar combinations in the presence of cuprous iodine and an amide; cellulose and cellulose derivatives such as esters of cellulose as for example triacetate cellulose, acetate cellulose, acetate-butyrate cellulose, nitrate cellulose, and sulfate cellulose, ethers of cellulose as for example, ethyl ether cellulose, hydroxymethyl ether cellulose, hydroxypropyl ether cellulose, carboxymethyl ether cellulose, ethyl hydroxyethyl ether cellulose, cyanoethylethyl ether cellulose, ether-esters of cellulose as for example acetoxyethyl ether cellulose and benzoyloxypropyl ether cellulose, and urethane cellulose as for example phenyl urethane cellulose; thermotropic liquid crystalline polymers such as celluloses and their derivatives as for example hydroxypropyl cellulose, ethyl cellulose propionoxypropyl cellulose, thermotropic liquid crystalline polymers such as celluloses and their derivatives as for example hydroxypropyl cellulose, ethyl cellulose propionoxypropyl cellulose; thermotropic copolyesters as for example copolymers of 6-hydroxy-2-naphthoic acid and p-hydroxy benzoic acid, copolymers of 6-hydroxy-2-naphthoic acid, terephthalic acid and p-amino phenol, copolymers of 6-hydroxy-2-naphthoic acid, terephthalic acid and hydroquinone, copolymers of 6-hydoroxy-2-naphtoic acid, p-hydroxy benzoic acid, hydroquinone and terephthalic acid, copolymers of 2,6-naphthalene dicarboxylic acid, terephthalic acid, isophthalic acid and hydroquinone, copolymers of 2,6-naphthalene dicarboxylic acid and terephthalic acid, copolymers of p-hydroxybenzoic acid, terephthalic acid and 4,4'-dihydoxydiphenyl, copolymers of p-hydroxybenzoic acid, terephthalic acid, isophthalic acid and 4,4'-dihydroxydiphenyl, p-hydroxybenzoic acid, isophthalic acid, hydroquinone and 4,4'-dihydroxybenzophenone, copolymers of phenylterephthalic acid and hydroquinone, copolymers of chlorohydroquinone, terephthalic acid and p-acetoxy cinnamic acid, copolymers of chlorohydroquinone, terephthalic acid and ethylene dioxy-4,4'-dibenzoic acid, copolymers of hydroquinone, methylhydroquinone, p-hydroxybenzoic acid and isophthalic acid, copolymers of (1-phenylethyl)hydroquinone, terephthalic acid and hydroquinone, and copolymers of poly(ethylene terephthalate) and p-hydroxybenzoic acid; and thermotropic polyamides and thermotropic copoly (amide-esters).

Also illustrative of useful organic fibers for use in the fabrication of fibrous layer 14 are those composed of extended chain polymers formed by polymerization of α,β-unsaturated monomers of the formula:

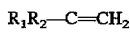

$$R_1R_2-C=CH_2$$

wherein:

$R_1$ and $R_2$ are the same or different and are hydrogen, hydroxy, halogen, alkylcarbonyl, carboxy, alkoxycarbonyl, heterocycle or alkyl or aryl either unsubstituted or substituted with one or more substituents selected from the group consisting of alkoxy, cyano, hydroxy, alkyl and aryl. Illustrative of such polymers of α,β-unsaturated monomers are polymers including polystyrene, polyethylene, polypropylene, poly(1-octadence), polyisobutylene, poly(1-pentene), poly(2-methylstyrene), poly(4-methylstyrene), poly(1-hexene), poly(1-pentene), poly(4-methoxystrene), poly(5-methyl-1-hexene), poly(4-methylpentene), poly(1-butene), polyvinyl chloride, polybutylene, polyacrylonitrile, poly(methyl pantene-1), poly(vinyl alcohol), poly(vinyl-acetate), poly(vinyl butyral), poly(vinyl chloride), poly(vinylidene chloride), vinyl chloride-vinyl acetate chloride copolymer, poly(vinylidene fluoride), poly(methyl acrylate), poly(methyl methacrylate), poly(methacrylo-nitrile), poly(acrylamide), poly(vinyl fluoride), poly(vinyl formal), poly(3-methyl-1-butene), poly(1-pentene), poly(4-methyl-1-butene), poly(1-pentene), poly(4-methyl-1-pentence, poly(1-hexane), poly(5-methyl-1-hexene), poly(1-octadence), poly(vinyl-cyclopentane), poly(vinylcyclothexane), poly(a-vinyl-naphthalene), poly(vinyl methyl ether), poly(vinyl-ethylether), poly(vinyl propylether), poly(vinyl carbazole), poly(vinyl pyrolidone), poly(2-chlorostyrene), poly(4-chlorostyrene), poly(vinyl formate), poly(vinyl butyl ether), poly(vinyl octyl ether), poly(vinyl methyl ketone), poly(methyl-isopropenyl ketone), poly(4-phenylstyrene) and the like.

In the most preferred embodiments of the invention, composite articles include a fiber network, which may include a high molecular weight polyethylene fiber, a high molecular weight polypropylene fiber, an aramide fiber, a high molecular weight polyvinyl alcohol fiber, a high molecular weight polyacrylonitrile fiber or mixtures thereof. U.S. Pat. No. 4,457,985 generally discusses such high molecular weight polyethylene and polypropylene fibers, and the disclosure of this patent is hereby incorporated by reference to the extent that it is not inconsistent herewith. In the case of polyethylene, suitable fibers are those of molecular weight of at least 150,000, preferably at least one million and more preferably between two million and five million. Such extended chain polyethylene (ECPE) fibers may be grown in solution as described in U.S. Pat. No. 4,137,394 to Meihuzen et al., or U.S. Pat. No. 4,356,138 of Kavesh et al., issued Oct. 26, 1982, or a filament spun from a solution to form a gel structure, as described in German Off. 3,004,699 and GB 2051667, and especially described in application Ser. No. 572,607 of Kavesh et al., filed Jan. 20, 1984 (see EPA 64,167, published Nov. 10, 1982). As used herein, the term polyethylene shall mean a predominantly linear polyethylene material that may contain minor amounts of chain branching or comonomers not exceeding 5 modifying units per 100 main chain carbon atoms, and that may also contain admixed therewith not more than about 50 wt % of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as anti-oxidants, lubricants, ultra-violet screening agents, colorants and the like which are commonly incorporated by reference. Depending upon the formation technique, the draw ratio and temperatures, and other conditions, a variety of properties can be imparted to these fibers. The tenacity of the fibers should be at least 15 grams/denier (as measured by an Instron Tensile Testing Machine), preferably at least 20 grams/denier, more preferably at least 25 grams/denier and most preferably at least 30 grams/denier. Similarly, the tensile modulus of the fibers, as measured by an Instron tensile testing machine, is at least 300 grams/denier, preferably at least 500 grams/denier and more preferably at least 1,000 grams/denier and most preferably at least 1,200 grams/denier. These highest values for tensile modulus and tenacity are generally obtainable only by employing solution grown or gel fiber processes.

Similarly, highly oriented polypropylene fibers of molecular weight at least 200,000, preferably at least one million and more preferably at least two million may be used. Such high molecular weight polypropylene may be formed into reasonably well oriented fibers by the techniques prescribed in the various references referred to above, and especially by the technique of U.S. Ser. No. 572,607, filed Jan. 20, 1984, of Kavesh et al. and commonly assigned. Since polypropylene is a much less crystalline material than polyethylene and contains pendant methyl groups, tenacity values achievable with polypropylene are generally substantially lower than the corresponding values for polyethylene. Accordingly, a suitable tenacity is at least 8 grams/denier, with a preferred tenacity being at least 11 grams/denier. The tensile modulus (as measured by an Instron Tensile Testing Machine) for polypropylene is at least 160 grams/denier, preferably at least 200 grams/denier. The particularly preferred ranges for the above-described parameters can advantageously provide improved performance in the final article.

High molecular weight polyvinyl alcohol fibers having high tensile modulus are described in U.S. Pat. No. 4,440, 711 to Y. Kwon et al., which is hereby incorporated by reference to the extent it is not inconsistent herewith. In the case of polyvinyl alcohol (PV-OH), PV-OH fiber of molecular weight of at least about 200,000. Particularly useful Pv-OH fiber should have a tensile modulus (as measured by an Instron Tensile Testing Machine) of at least about 300 g/d, a tenacity of at least 7 g/d (preferably at least about 10 g/d, more preferably at about 14 g/d, and most preferably at least about 17 g/d), and an energy-to-break of at least about 8 joules/gram. PV-OH filaments having a weight average molecular weight of at least about 200,000, a tenacity of at least about 10 g/d, a tensile modulus (as measured by an Instron Tensile Testing Machine) of at least about 300 g/d, and an energy-to-break of about 8 joules/gram are more useful in producing a ballistic resistant article. PV-OH fiber having such properties can be produced, for example, by the process disclosed in U.S. Pat. No. 4,599,267.

In the case of polyacrylonitrile (PAN), PAN fiber of molecular weight of at least about 400,000. Particularly useful PAN filament should have a tenacity of at least about 10 g/d (as measured by an Instron Tensile Testing Machine) and an energy-to-break of at least about 8 joules/gram. PAN fiber having a molecular weight of at least about 400,000, a tenacity of at least about 15 to about 20 g/d and an energy-to-break of at least 8 joules/gram is most useful in producing ballistic resistant articles; and such fibers are disclosed, for example, in U.S. Pat. No. 4,535,027.

In the case of aramid fibers, suitable aramid fibers formed principally from aromatic polyamide are described in U.S. Pat. No. 3,671,542, which is hereby incorporated by reference. Preferred aramid fiber will have a tenacity of at least about 20 g/d (as measured by an Instron Tensile Testing Machine), a tensile modulus of at least about 400 g/d (as measured by an Instron Tensile Testing Machine) and an energy-to-break at least about 8 joules/gram, and particularly preferred aramid fibers will have a tenacity of at least about 20 g/d, a modulus of at least about 480 g/d and an energy-to-break of at least about 20 joules/gram. Most preferred aramid fibers will have a tenacity of at least about 20 g/denier, a modulus of at least about 900 g/denier and an energy-to-break of at least about 30 joules/gram. For example, poly(phenylene terephthalamide) fibers produced commercially by Dupont Corporation under the trade name of Kevlar® 29, 49, 129 and 149 having moderately high moduli and tenacity values are particularly useful in forming ballistic resistant composites. Also useful in the practice of this invention is poly(metaphenylene isophthalamide) fibers produced commercially by Dupont under the tradename Nomex®.

In the case of liquid crystal copolyesters, suitable fibers are disclosed, for example, in U.S. Pat. Nos. 3,975,487; 4,118,372; and 4,161,470, hereby incorporated by reference. Tenacities of about 15 to about 30 g/d (as measured by an Instron Tensile Testing Machine) and preferably about 20 to about 25 g/d, and tensile modulus of about 500 to 1500 g/d (as measured by an Instron Tensile Testing Machine) and preferably about 1000 to about 1200 g/d are particularly desirable.

As depicted in FIGS. 1 and 2 article 10 of this invention includes one or more polymeric layers 16 bonded to a surface of one or more of fibrous layers 14. As used herein a "polymeric layer" is a continuous or discontinuous layer comprised of one or more polymeric materials which may optionally contain one or more additional components as for example one or more particulate or fibrous filler materials or which may optionally include one or more rigid components provided that the layer has the required flexibility.

The number of polymeric layers 16 may vary widely, the only requirement is that there is at least one polymeric layer 16 bound to a surface of at least one fibrous layer 14. In the preferred embodiments of the invention, a polymeric layer 16 is bonded to at least one surface of each fibrous layer 14, and the number and types of polymeric layers 16 are such that article 10 has the required flexibility.

The shape of polymeric layer 16 and the area percent of fibrous layer 14 bonded to polymeric layer 16 may vary widely. For example, polymeric layer 16 may be in the form of a sheet or sheet-like (e.g. contiguous or overlapping ribbons, steps, squares and the like which form a sheet-like layer) which is bonded to or in contact with 100 percent or substantially one hundred percent of a surface of the fibrous layer. Alternatively, polymeric layer 16 may be formed from a plurality of various geometrically shaped polymeric bodies (e.g. ribbons, hexagons, triangles, rectangles, squares, strips) which cover less than 100% of the surface of fibrous layer 14. In the preferred embodiments of this invention, polymeric layer 16 is formed from polymeric sheets, strips, ribbons and the like and is bonded to a least about 5 area percent of a major surface of fibrous layer 14 based on the total area of said surface. In the more preferred embodiments of the invention, polymeric layer 16 is bonded to at least about 20 area percent of a major surface of fibrous layer 14, and in the most preferred embodiments of the invention, polymeric layer 16 is bonded to at least about 50 area percent of a major surface of a fibrous layer 14 with those embodiments in which polymeric layer 16 covers up to about 95 to about 100 percent of a major surface of fibrous layer 14 being the embodiments of choice.

Lamination of polymeric layer 16 to fibrous layer 14 as continuous sheet may cause stiffening of the structure. Although for certain applications this may be acceptable provided that article 10 has the required degree of flexibility, for many applications where relatively high penetration resistance and flexibility are desired, such as a ballistic resistant vest, it is desirable to laminate polymeric layer 16 to fibrous layer 14 as discontinuous geometric shapes. In these applications, it is preferred that polymeric layer 16 include highly penetration resistance structures formed from rigid ballistic resistant materials laminated to fibrous layer 14, to polymeric layer 16 or a combination thereof. Preferred geometric shapes will be space filling and will preferably provide more than one, preferably two or three and more preferably three directions for continuous or semi-continuous seams which preferably intersect at an angle to each other (more preferably an angle of about 60°) in order to allow flexing in multiple directions as depicted in FIGS. 6 to 11. Such construction regardless of the thickness and rigidity of polymeric layer 16 can drape around doubly curved surfaces and thus exhibit the desired flexibility. (See FIGS. 8 to 11)

Figure 12:
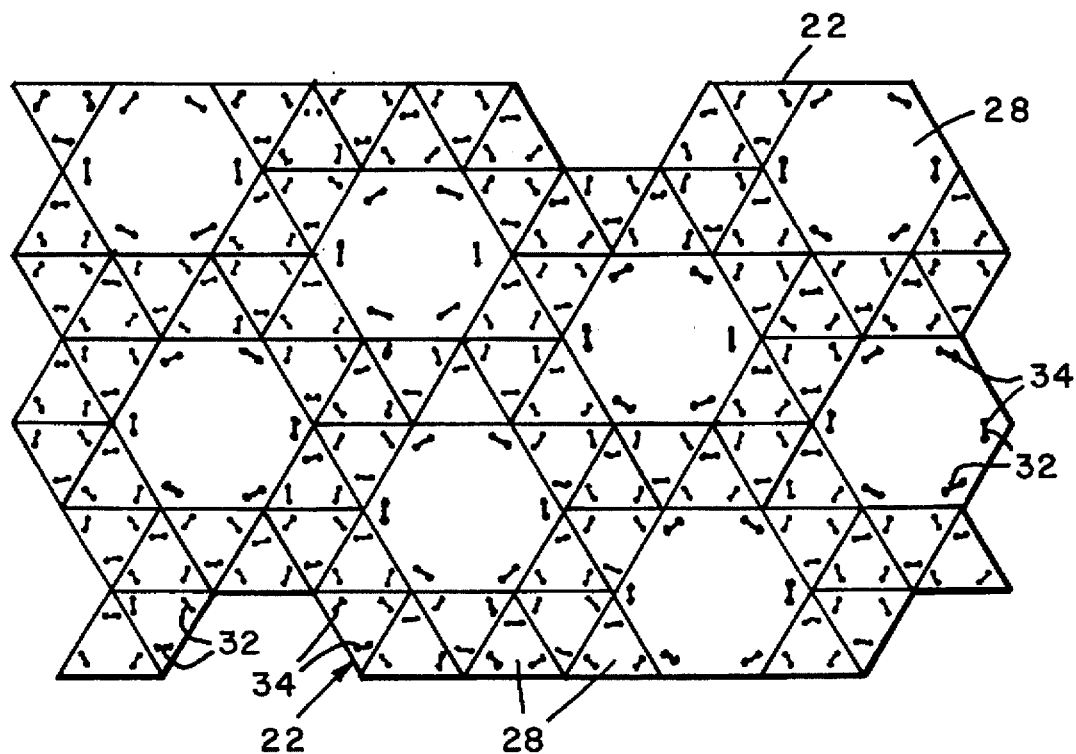
FIG. 12 is a frontal view of an embodiment of this invention having shaped rigid panels laminated to a fabric in which the panels are in the shape of equilateral triangles and hexagons.
Figure 13:
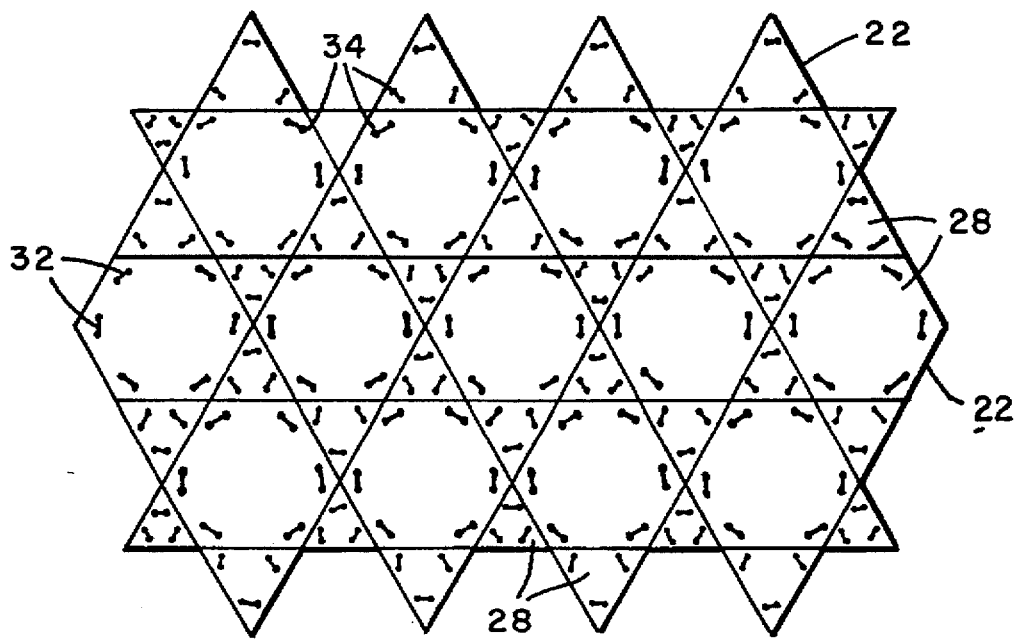
FIG. 13 is a frontal view of another embodiment of this invention having shaped rigid panels laminated to a fabric in which the panels are in the shape of equilateral triangles and hexagons.

Primarily because of the improved flexibility a preferred construction consists of an arrangement of trianglar shapes (preferably right triangular shapes equilateral triangular shapes or a combination thereof and more preferably equilateral triangular shapes) which are arranged to be space filling as depicted in FIGS. 6 to 11. A desirable modification to this construction is the inclusion of compatible geometric shapes such as hexagons, parallelograms, trapezoids and the like, which correspond to shapes obtainable by fusion of two or more triangles at appropriate edges. The most preferred compatible shapes are hexagons, as depicted in FIGS. 12 and 13. Such space filling constructions allow a wide range of compromises between flexibility and minimization of seams and maximization penetration resistance.

An alternate to discontinuous geometric shapes is the use of relatively rigid penetration resistant polymeric layers 16 containing slits. The use of slits, perforations and the like can provide for enhanced ballistic protection while at the same time not significantly affecting the flexibility of the ballistic article to a significant extent. It is desirable that slits be aligned so that there are three or more directions along which the polymeric layer can easily flex, in an analogous manner to that described previously for the individual geometric shapes.

The polymeric materials employed in the practice of this invention can vary widely and include thermosetting resins, thermoplastic resins, and a combination thereof. As used herein "thermoplastic resins" are resins which can be heated and softened, cooled and hardened many times without undergoing a basic alteration, and "thermosetting resins" resins which cannot be presoftened and reworked after molding, extruding or casting and which attain new, irreversible properties when once set at a temperature which is critical to each resin.

The choice of any thermosetting resin and thermoplastic resin for use in the formation of polymeric layer 16 and their relative amounts in blends of such resins may vary widely depending on a number of factors including whether the matrix material has any penetration resistant properties of its own, the rigidity of the thermoplastic and thermosetting resins, and upon the shape, heat resistance, shelf life, wear resistance, flammability resistance and other desired properties desired for the composite article. In general, the higher the proportion of the thermoplastic resin and the lower the proportion of the thermosetting resin in the matrix, the greater the toughness and impact resistance and the longer the shelf life of the composite. However, longer mold cycle times and mold cooling cycles may be required with greater amounts of the thermoplastic resin. Conversely, the lower the proportion of the thermoplastic resin and the higher the proportion of the thermosetting resin in the matrix, the greater the rigidity and the shorter the mold cycle times and mold cooling cycles of the composites. However, toughness and impact resistance of the composite may be decreased relative to those of composites having greater amounts of the thermoplastic resin, and the shelf life of the composites may be decreased relative to those of composites having greater amounts of the thermoplastic resin. Thus, the relative proportions of thermosetting resins and thermoplastic resins are selected to achieve the desired physical properties and process parameters. One important characteristic of the matrix material is its modulus which determines the flexibility of the article and is preferably equal to or less than about 15,000 psi (103,000 kPa) where polymeric 16 is a continuous sheet. Higher modulus resins can be employed where other means as for example, slits, and discontinuous polymeric layers 16 are employed to increase flexibility. The lower limit for the modulus is not critical and usually the lower the modulus the more desirable are composite properties. In the preferred embodiments of the invention, the thermoplastic and thermosetting resins are selected such that the polymeric material has a modulus equal to or less than about 10,000 psi (69,000 kPa) for continuous polymeric layer 16 sheets, and in the particularly preferred embodiments, these resins are selected such that polymeric layer has a modulus equal to or less than about 5,000 psi (34,500 kPa) for continuous polymeric layer 16 sheets. In the most preferred embodiments of the invention, the thermoplastic and thermosetting resins are selected such that polymeric layer 16 has a modulus equal to or less than about 3,000 psi (34,5000 kPa) for continuous polymeric layer 16 sheets.

Thermosetting resins useful in the practice of this invention may vary widely. Illustrative of useful thermosetting resins are alkyds such as those derived from esterification of polybasic acids, as for example, phthalic anhydride, fumaric acid, maleic anhydride, isophthalic acid, terephthalic acid, trimesic acid, hemimellitic acid, succinic anyhydride, fatty acids derived from mineral or vegetable oils and the like, and polyhydric alcohols as for example glycerol, ethylene glycol, propylene glycol, pinacol, 1,4-butanediol, 1,3-propanediol, sorbitol, pentaerythritol, 1,2-cyclohexanediol and the like. Other useful thermosetting resins are acrylics such as crosslinkable polyacrylics, polyacrylates, epoxydiacrylates, urethane diacrylates and the like. Still other useful thermosetting resins are amino resins derived from reaction between formaldehyde and various amino compounds such as melamine, urea, aniline, ethylene urea, sulfonamide, dicyanodiamide and the like. Other useful thermosetting resins include urethanes derived from reaction of polyisocyanates or diisocyanates such as 2,6-tolylene diisocyanate, 2,4-tolylene diisocyanate, 4,4'-diphenylmethane diisocyanate, 4,4'-dicyclohexylmethane diisocyanate and the like, and polyols such as glycerin, ethylene glycol, diethylene glycol, trimethylolpropane, 1,2,6-hexanetriol, sorbitol, pentaerythritol and the like.

Exemplary of still other thermosetting resins useful in the practice of this invention are unsaturated polyesters derived from reaction of dibasic acids such as maleic anhydride, fumaric acid, adipic acid, azelaic acid and the like, and dihydric alcohols such as ethylene glycol and propylene glycol, 1,3-butylene glycol, 2,3-butylene glycol, diethylene glycol, dipropylene glycols and the like; and silicones such as dimethyldichlorosilane and the like.

Yet another class of useful thermosetting resins are epoxies based on saturated or unsaturated aliphatic, cycloaliphatic, aromatic and heterocyclic epoxides. Useful epoxies include glycidyl ethers derived from epichlorohydrin adducts and polyols, particularly polyhydric phenols. Another useful epoxide is the diglycidyl ether of bisphenol A. Additional examples of useful polyepoxides are resorcinol diglycidyl ether, 3,4-epoxy-6-methylcyclohexylmethyl-9,10-epoxystearate, 1,2,-bis(2,3-epoxy-2-methylpropoxy)ethane, diglycidyl ether of 2,2-(p-hydroxyphenyl)propane, butadiene dioxide, dicyclopentadiene dioxide, pentaerythritol tetrakis(3,4-epoxycyclohexanecarboxylate), vinylcyclohexene dioxide, divinylbenzene dioxide, 1,5-pentadiol bis(3,4-epoxycyclo-hexane carboxylate), ethylene glycol bis(3,4-epoxycyclo-hexane carboxylate), 2,2-diethyl-1,3-propanediol bis(3,4-epoxycyclohexanecarboxylate), 1,6-hexanediol bis(3,4-epoxycyclohexanecarboxylate), 2-butene-1,4-diol bis(3,4-epoxy-6-methylcyclohexanecarboxylate), 1,1,1-trimethylolpropane tris(3,4-epoxycyclohexanecarboxylate), 1,2,3-propanetriol tris(3,4-epoxycyclohexanecarboxylate), dipropylene glycol bis(2-ethylexyl-4,5-epoxycyclohexane-1,2-dicarboxylate), diethylene glycol bis(3,4-epoxy-6-methylcyclohexanecarboxylate), triethylene glycol bis(3,4-epoxycyclohexanecarboxylate), 3,4-epoxycyclohexylmethyl 3,4-epoxycyclohexanecarboxylate, 3,4-epoxy-1-methylcyclohexylmethyl 3,4-epoxy-1-methylcyclohexanecarboxylate, bis(3,4-epoxycyclohexylmethyl)pimelate, bis(3,4-epoxy-6-methylenecyclohexylmethyl)maleate, bis(3,4-epoxy-6-methylcyclohexylmethyl)succinate, bis(3,4-epoxycyclohexylmethyl)oxalate, bis(3,4-epoxy-6-methylcyclohexylmethyl)sebacate, bis(3,4-epoxy-6-methylcyclohexylmethyl)adipate, bis(3,4-epoxycyclohexylmethyl)terephtalate, 2,2'-sulfonyldiethanol bis(3,4-epoxycyclohexanecarboxylate), N,N'-ethylene bis(4,5-epoxycyclohexane-1,2-dicarboximide), di(3,4-epoxycyclohexylmethyl) 1,3-tolylenedicarbamate, 3,4-epoxy-6-methylcyclohexanecarboxaldehyde acetal, 3,9-bis(3,4-epoxycyclohexyl) spirobi-(methadioxane), and the like.

Useful thermosetting resins also include phenolic resins produced by the reaction of phenols and aldehydes. Useful phenols include phenol, o-cresol, m-cresol, p-cresol, p-tertbutylphenol, p-tertoctylphenol, p-nonylphenol, 2,3-xylenol, 2,4-xylenol, 2,5-xylenol, 2,6-xylenol, 3,1-xylenol, 3,4-xylenol, resorcinol, bisphenol-A and the like. Useful aldehydes include formaldehyde, acetoldehyde, propionaldehyde, n-butyraldehyde, isobutyraldehyde, glyoxal, furrural and the like.

Other useful thermosetting resins are aromatic vinylesters such as the condensation product of epoxide resins and unsaturated acids usually diluted in a compound having double bond unsaturation such as vinylaromatic monomer as for example styrene and vinyltoluene, and diallyl phthalate. Illustrative of useful vinylesters are diglycidyl adipate, diglycidyl isophthalate, di(2,3-epoxybutyl)adipate, di(2,3-epoxybutyl)oxalate, di(2,3-epoxyhexyl)succinate, d(3,4-epoxybutyl)maleate, d(2,3-epoxyoctyl)pimelate, di(2,3-epoxybutyl)phthalate, di(2,3-epoxyoctyl)tetrahydrophthalate, di(4,5-epoxy-dodecyl)maleate, di(2,3-epoxybutyl)terephthalate, di(2,3-epoxypentyl)thiodipropionate, di(5,6-epoxy-tetradecyl)diphenyldicarboxylate, di(3,4-epoxyheptyl)sulphonyldibutyrate, tri(2,3-epoxybutyl) 1,2,4 butanetricarboxylate, di(5,6-epoxypentadecyl)maleate, di(2,3-epoxybutyl)azelate, di(3,4-epoxybutyl)citrate, di(5,6-epoxyoctyl)cyclohexane-1,3-dicarboxylate, di(4,5-epoxyoctadecyl)malonate, bisphenol-A-fumaric acid polyester and the like.

Thermoplastic resins for use in the practice of this invention may also vary widely. Illustrative of useful thermoplastic resins are polylactones such as poly(pivalolactone), poly (ε-caprolactone) and the like; polyurethanes derived from reaction of diisocyanates such as 1,5-naphalene diisocyanate, p-phenylene diisocyanate, m-phenylene diisocyanate, 2,4-toluene diisocyanate, 4,4' diphenylmethane diisocyanate, 3-3'-dimethyl-4,4'diphenyl-methane diisocyanate, 3,3'dimethyl-4,4'biphenyl diisocyanate, 4,4' diphenylisopropylidiene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, tolidine diisocyanate, hexamethylene diisocyanate, 4,4'-diisocyananodiphenylmethane and the like and linear long-chain diols such as poly (tetramethylene adipate), poly(ethylene adipate), poly(1,4-butylene adipate), poly(1,5-pentylene adipate), poly(1,3 butylene adipate), poly(ethylene succinate), poly(2,3-butylene succinate), polyether diols and the like; polycarbonates such as poly[methane bis(4-phenyl)carbonate], poly [1,1-ether bis(4-phenyl)carbonate], poly[diphenylmethane bis(4-phenyl)carbonate], poly[1,1-cyclohexane bis(4-phenyl)carbonate] and the like; poly sulfones; polyether ether ketones; polyamides such as poly(4-amino butyric acid), poly(hexamethylene adipamide), poly(6-aminohexanoic acid), poly(m-xylylene adipamide), poly(p-xylylene sebacamide), poly(2,2,2-trimethyl hexamethylene terephthalamide), poly(metaphenyleneisophthalamide) (Nomex), poly(p-phenylene terephthalamide) (Kevlar), and the like; polyesters such as poly(ethylene azelate), poly (ethylene-1,5-naphthalate), poly(1,4-cyclohexane dimethylene terephthalate), poly(ethylene oxybenzoate) (A-Tell), poly(para-hydroxy benzoate) (Ekonol), poly(1,4-cyclohexylidene dimethylene terephthalate) (Kodel)(as), poly(1,4-cyclohexylidene dimethylene terephthalate) (Kodel) (trans), polyethylene terephthalate, polybutylene terephthalate and the like; poly(arylene oxides) such as poly(2,6-dimethyl-1,4-phenylene oxide), poly(2,6-diphenyl-1,4-phenylene oxide) and the like; poly(arylene sulfides) such as poly(phenylene sulfide) and the like; polyetherimides; thermoplastic elastomers such as polyurethane elastomers, fluoroelastomers, butadiene/acrylonitrile elastomers, silicone elastomers, polybutadiene, polyisobutylene, ethylene-propylene copolymers, ethylene-propylene-diene terpolymers, polychloroprene, polysulfide elastomers, block copolymers, made up of segments of glassy or crystalline blocks such as polystyrene, poly(vinyltoluene), poly(t-butyl styrene), polyester and the like and the elastomeric blocks such as polybutadiene, polyisoprene, ethylene-propylene copolymers, ethylene-butylene copolymers, polyether ester and the like as for example the copolymers in polystyrene-polybutadiene-polystyrene block copolymer manufactured by Shell Chemical Company under the trade name of Kraton; vinyl polymers and their copolymers such as polyvinyl acetate, polyvinyl alcohol, polyvinyl chloride, polyvinyl butyral, polyvinyl-idene chloride, ethylene-vinyl acetate copolymers, and the like; polyacrylics, polyacrylate and their copolymers such as polyethyl acrylate, poly(n-butyl acrylate), polymethyl methacrylate, polyethyl methacrylate, poly(n-butyl methacrylate), poly(n-propyl methacrylate), polyacrylamide, polyacrylonitrile, polyacrylic acid, ethylene-acrylic acid copolymers, methyl methacrylate-styrene copolymers, ethylene-ethyl acrylate copolymers, methacrylated budadiene-styrene copolymers and the like; polyolefins such as low density polyethylene, polypropylene, chlorinated low density polyethylene, poly(4-methyl-1-pentene) and the like; ionomers; and polyepichlorohydrins; polycarbonates and the like.

Preferred polymeric materials are thermoplastic resins. More preferred polymeric materials are polyolefins, polyamides and polyesters. Most preferred polymeric materials are polyolefins such as polyethylene, polypropylene and the like, polyamides such as nylon 6 and nylon 66.

Polymeric layer 16 may be formed solely from the polymeric material or it may include optional materials known to those of skill in the art. For example, the polymeric layer may consist of a polymeric matrix containing dispersed particulate reinforcement. Illustrative of useful particulate fillers are carbon and metal and non-metal ceramic such as those described in C.F. Liable, *Ballistic Materials and Penetration Mechanics*, Chapters 5–7 (1980) and include single oxides such as aluminum oxide ($Al_2O_3$), barium oxide (BaO), beryllium oxide (BeO), calcium oxide (CaO), cerium oxide ($Ce_2O_3$ and $CeO_2$), chromium oxide ($Cr_2O_3$), dysprosium oxide ($Dy_2O_3$), erbium oxide ($Er_2O_3$), europium oxide: (EuO, $Eu_2O_3$, and $Eu_3O_4$), ($Eu_{16}O_{21}$), gadolinium oxide ($Gd_2O_3$), hafnium oxide ($HfO_2$), holmium oxide ($Ho_2O_3$), lanthanum oxide ($La_2O_3$), lutetium oxide ($Lu_2O_3$), magnesium oxide (MgO), neodymium oxide ($Nd_2O_3$), niobium oxide: (NbO, $Nb_2O_3$, and $NbO_2$), ($Nb_2O_5$), plutonium oxide: (PuO, $Pu_2O_3$, and $PuO_2$), praseodymium oxide: ($PrO_2$, $Pr_6O_{11}$, and $Pr_2O_3$), promethium oxide ($Pm_2O_3$), samarium oxide (SmO and $Sm_2O_3$), scandium oxide ($Sc_2O_3$), silicon dioxide ($SiO_2$), strontium oxide (SrO), tantalum oxide ($Ta_2O_5$), terbium oxide ($Tb_2O_3$ and $Tb_4O_7$), thorium oxide ($ThO_2$), thulium oxide ($Tm_2O_3$), titanium oxide: (TiO, $Ti_2O_3$, $Ti_3O_5$ and $TiO_2$), uranium oxide ($UO_2$, $U_3O_8$ and $UO_3$), vanadium oxide (VO, $V_2O_3$, $VO_2$ and $V_2O_5$), ytterbium oxide ($Yb_2O_3$), yttrium oxide ($Y_2O_3$), and zirconium oxide ($ZrO_2$). Useful ceramic materials also include boron carbide, zirconium carbide, beryllium carbide, aluminum beride, aluminum carbide, boron carbide, silicon carbide, aluminum carbide, titanium nitride, boron nitride, titanium carbide, titanium diboride, iron carbide, iron nitride, barium titanate, aluminum nitride, titanium niobate, boron carbide, silicon boride, barium titanate, silicon nitride, calcium titanate, tantalum carbide, graphites, tungsten; the ceramic alloys which include cordierite/MAS, lead zirconate titanate/PLZT, alumina-titanium carbide, alumina-zirconia, zirconia-cordierite/ ZrMAS; the fiber reinforced ceramics and ceramic alloys; glassy ceramics; as well as other useful materials. Preferred particulate fillers are non-metal and metal ceramic materials. Preferred ceramic materials are aluminum oxide, and metal and non-metal nitrides, borides and carbides.

Polymeric layer 16 may itself comprise a network of fibers as described for use in the fabrication of the fibrous layer dispersed in a matrix of a polymeric material. The filled polymeric layer may also be continuous or discontinuous, or may include slits, perforations or the like, or may be of varying thicknesses, to provide varying degrees of flexibility and ballistic protection. In these embodiments of the invention, the filaments are dispersed in a continuous phase of a matrix material which preferably substantially coats each filament contained in the bundle of filament. The manner in which the filaments are dispersed may vary widely. The filaments may be aligned in a substantially parallel, unidirectional fashion, or filaments may by aligned in a multidirectional fashion with filaments at varying angles with each other. In the preferred embodiments of this invention, filaments in each layer are aligned in a substantially parallel, unidirectional fashion such as in a prepreg, pultruded sheet and the like. One such suitable arrangement is where the polymeric layer comprises a plurality of layers or laminates in which the coated filaments are arranged in a sheet-like array and aligned parallel to one another along a common filament direction. Successive layers of such coated, uni-directional filaments can be rotated with respect to the previous layer to form a relatively flexible composite. An example of such laminate structures are composites with the second, third, fourth and fifth layers rotated +45°, −45°, 90° and 0°, with respect to the first layer, but not necessarily in that order. Other examples include composites with 0°/90° layout of yarn or filaments. Techniques and materials for fabricating these laminated structures are described in greater detail in U.S. Pat. Nos. 4,916,000; 4,623,574; 4,748,064; 4,457,985 and 4,403,012.

Figure 4:
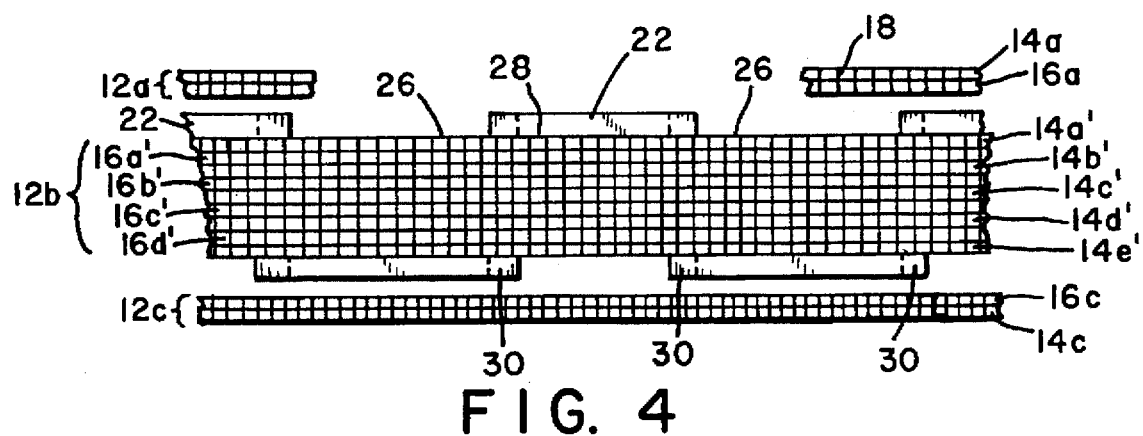
FIG. 4 is a cross-sectional view of the preferred embodiment of this invention of FIG. 3 taken along line 4—4 of FIG. 3.
Figure 5:
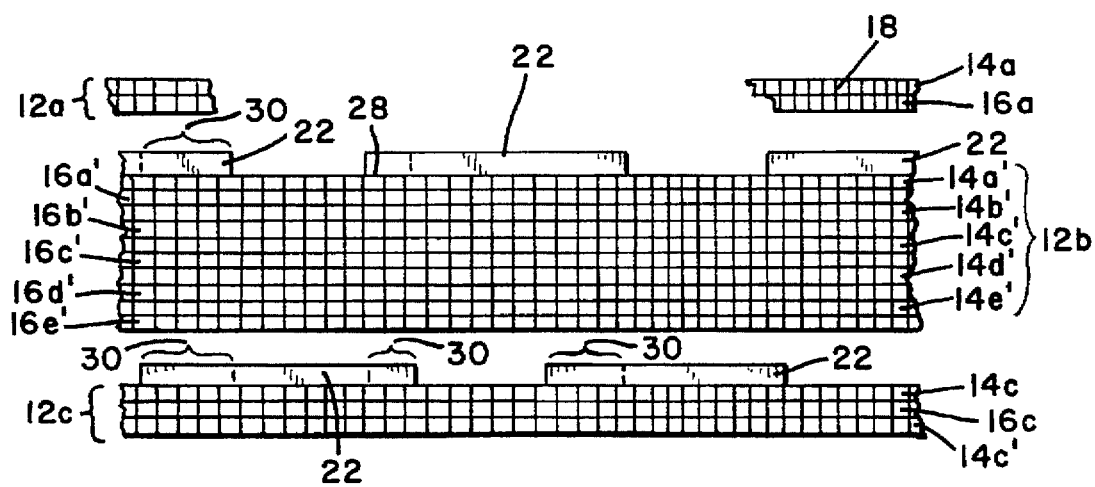
FIG. 5 is a cross-sectional view of another embodiment similar to that of FIG. 3 taken along line 4—4 of FIG. 3.

As depicted in FIGS. 3, 4, 6, and 7 in cross-section, article 10 comprises three distinct layers 12a, 12b and 12c, each consisting of a plurality of layers 14 and 16 bonded together and stitched together by horizontal stitches 18 and vertical stitches 20 (not depicted). Layer 12a is the outer layer which is exposed to the environment, and layer 12c is the inner layer closest to the body of the wearer. The two covering layers 12a and 12c sandwich a ballistic layer 12b, which, in the body armor of the figures, comprises a plurality of stitched and bonded layers 14a' to 14e' and 16a' to 16e' having a plurality of planar bodies 22 partially covering both outer surfaces of said plurality of layers 12 forming a pattern of covered areas 28 and uncovered areas 26 on the outer surfaces. As shown in FIGS. 4 and 5 the plurality 26 of planar bodies 22 are positioned on the two surfaces such that covered areas 24 on one surface are aligned with the uncovered areas 30 on the other surface. In the preferred embodiments of the invention depicted in FIGS. 3 and 4, each planar body 22 is uniformly larger than its corresponding uncovered area 26 such that planar bodies 22 adjacent to an uncovered area 26 partially overlap with the corresponding planar body 22 (of the area 26) on the other outer surface of the plurality of layers 14 by some portion 30. This is preferably accomplished by truncation of the edges of the bodies 22 or otherwise modification of such edges to allow for closer placement of bodies 16 on the surface such that a covered area 24 is larger than the complimentary uncovered area 28. Extensive disalignment between the various layers 12, is prevented by the securing means 18 and 20. The degree of overlap may vary widely, but in general is such that preferably more than about 90 area %, more preferably more than about 95 area % and most preferably more than about 99 area % of uncovered areas 26 on an outer surface of the plurality of layers 12 are covered by its corresponding planar body 22 on the other outer surface of the plurality of layers 12.

FIG. 5 depicts a variant of the embodiment of FIG. 4 which differs by placing planar bodies 22 on a surface of layer 12b and on a surface of layer 12c. Corresponding parts are referred to by like numerals.

As shown in the Figures, the position of planar bodies 22 can vary widely. For example, planar bodies 22 may be on an outside surface of a layer 12 or may be encapsulated inside of the plurality of layers 12 on interior surfaces. As depicted in FIGS. 6 to 11, planar bodies 22 are preferably space filling and will provide more than one, preferably two or three and more preferably three semi-continuous or continuous seams in different directions which preferably intersect at an angle with each other (more preferably at an angle of about 60°).

Figure 6:
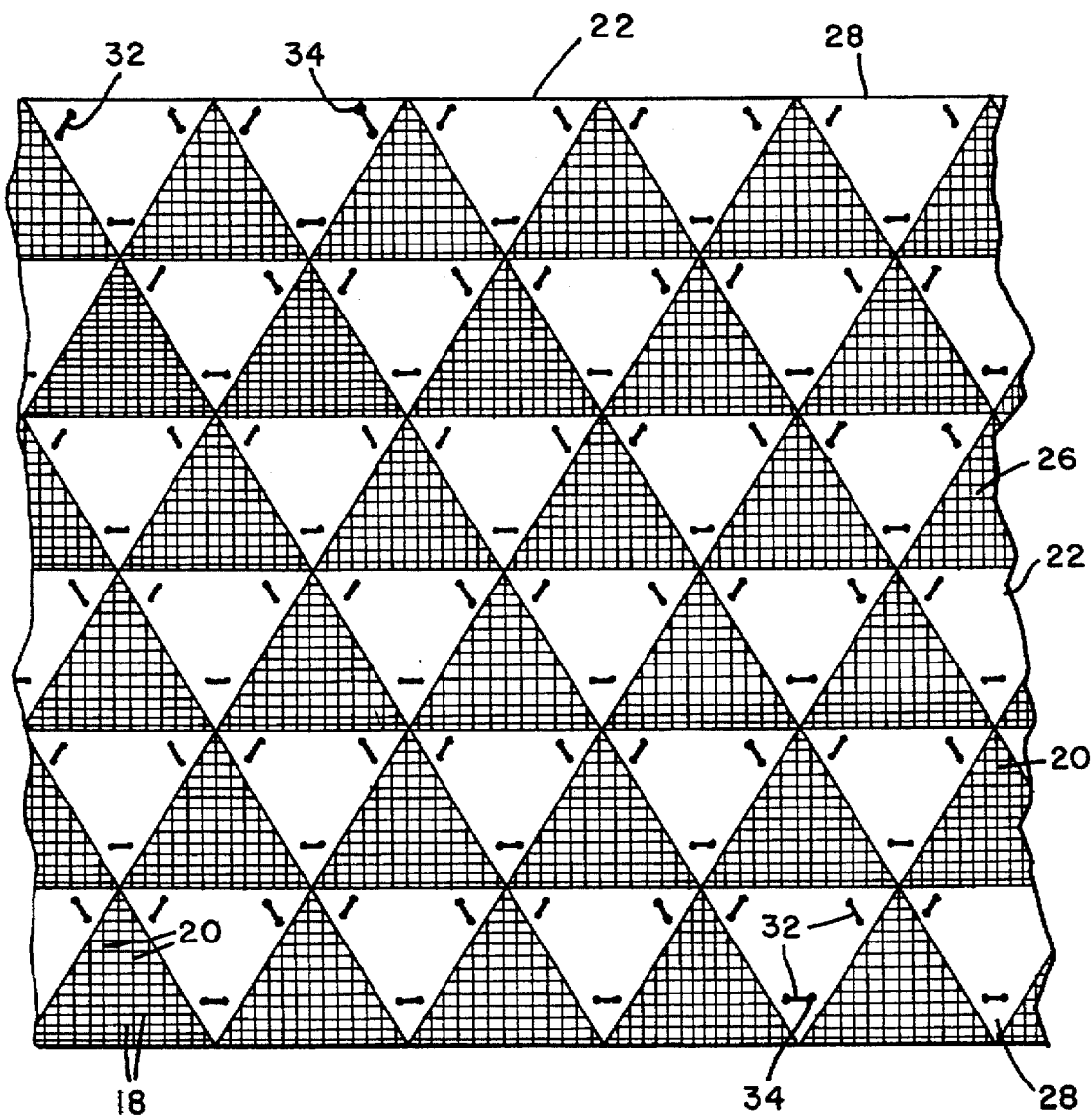
FIG. 6 is a depiction of a frontal view of equilateral triangular shaped rigid panels laminated to a fabric in the embodiment of FIG. 3.
Figure 7:
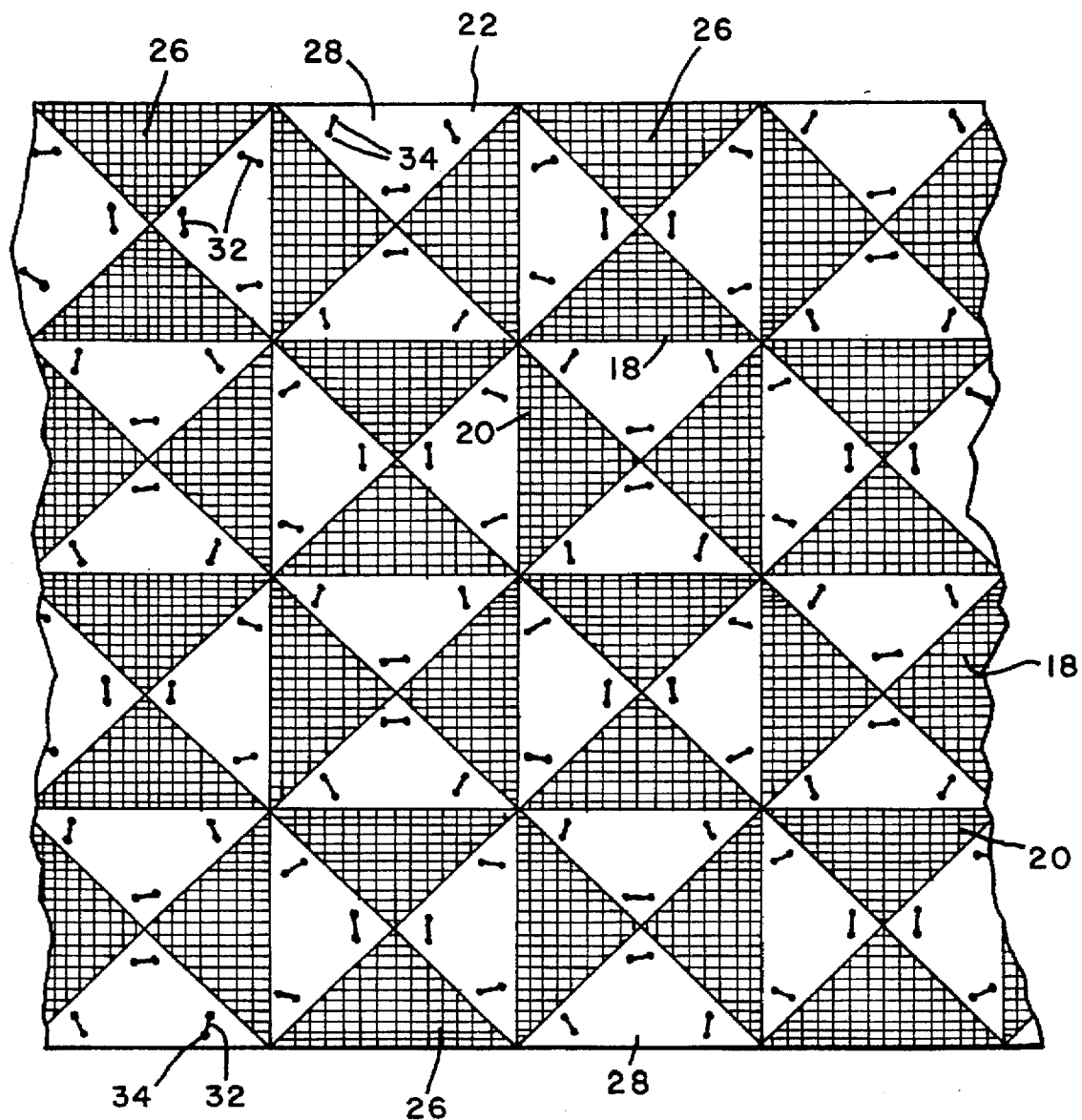
FIG. 7 is a depiction of a frontal view of right triangular shaped rigid panels laminated to a fabric in the embodiment of FIG. 3.

Other embodiments of this invention as depicted in FIGS. 4 to 14 may comprise a plurality of substantially planar rigid bodies 22 of various geometrical shapes such as triangular, hexagonal or trapezoidal shaped bodies (preferably having rounded or truncated edges to minimize damage to layers 14 and 16 and to increase flexibility) laminated to fibrous layer 14 by way of polymeric layer 16. In other embodiments, bodies 22 can be encapsulated in polymeric 16 and/or in fibrous layer 14. As depicted in FIGS. 6 and 7 preferred geometric shapes are space filling and will provide more than one continuous or semi-continuous seam, preferably two or three and more preferably three continuous or semi-continuous seams having different seam directions which are preferably at an angle with each other (more preferably an angle of about 60°) in order to allow flexing in multiple directions (SEE FIGS. 6 to 13). As shown in FIGS. 4 to 13 in the preferred embodiments of this invention, article 10 includes a plurality of composite layers 12 in which rigid substantially planar bodies 22 are laminated or bonded to fibrous layer 12 by way of polymeric layer 16 such that bodies 22 in adjacent layers 12 are offset to provide continuous and overlapping rigid protection. In addition to bonding or lamination, bodies 22 may also be attached to layer 12 by additional securing means. Such additional securing means for attaching planar bodies 16 to substrate layer 14 may vary widely and may include any means normally used in the art to provide this function. Illustrative of useful attaching means are adhesives such as those discussed in *R.C. Liable, Ballistic Materials and Penetration Mechanics*, Elsevier Scientific Publishing Co. (1980). Illustrative of other useful attaching means are bolts, screws, staples mechanical interlocks, stitching, or a combination of any of these conventional methods. As depicted in FIGS. 3 to 14 in the preferred embodiments of the invention planar bodies 22 are stitched to the surface of layer 12 by way of stitches 32 and eyes 34. Optionally, the stitching may be supplemented by adhesive. Bodies 22 are preferably sewn and bonded at one or more of the apexes of bodies 22, more preferably a distance from the edge of a body 22 as depicted in FIGS. 5,6 and 14 or laminated and sewn. By sewing and bonding a distance from the edge of body 22, flexibility is enhanced. To prevent extensive disalignment between the various composite layers 12, adjacent layers can be stitched together.

Polymeric layer 16 can be composed of any thermoplastic or thermosetting polymeric material but is preferably an adhesive polymer. When used, the adhesive material is preferably a low modulus, elastomeric material which has a tensile modulus, measured at about 23° C., of less than about 7,000 psi (41,300 kpa). The glass transition temperature (Tg) of the elastomeric material (as evidenced by a sudden drop in the ductility and elasticity of the material) is less than about 0° C. Preferably, the Tg of the elastomeric material is less than about −40° C., the more preferably is less than about −50° C. The elastomeric material preferably has an elongation to break of at least about 5%. Preferably, the elongation to break of the elastomeric material is at least about 30% more preferably is at least about 50% and most preferably is at least about 100%. Representative examples of suitable elastomeric materials for use as a flexible adhesive are those which have their structures, properties, and formulation together with cross-linking procedures summarized in the Enclycopedia of Polymer Science, Vol. 5 in the section Elastomers-Synthetic (John Wiley & Sons, Inc. 1964) and "Handbook of Adhesives", Van Nostrand Reinhold Company (1977), 2nd Ed., Edited by Irving Skeist. Illustrative of such materials are block copolymers of conjugated dienes such as butadiene and isoprene, and vinyl aromatic monomers such as styrene, vinyl toluene and t-butyl styrene; polydienes such as polybutadiene and polychloroprene, polyisoprene; natural rubber; copolymers and polymers of olefins and dienes such as ethylene-propylene copolymers, ethylene-propylene-diene terpolymers and poly(isobutylene-co-isoprene), polyfulfide polymers, polyurethane elastomers, and chlorosulfonated polyethylene; pasticized polyvinylchloride using dioctyl phthate or other plasticizers well known in the art; butadiene acrylonitrile elastomers; polyacrylates such as poly(acrylic acid), poly(methylcyanoacrylate), poly(methylacrylate), poly(ethyl acrylate), poly(propylacrylate), poly(methylacrylonitrile), poly(acrylamide), poly(N-isopropylacrylamide) and the like, polyesters; polyethers; fluoroelastomers; poly(bismaleimide); flexible epoxies; flexible phenolics; polyurethanes; silicone elastomers; flexible polyamides; unsaturated polyesters; vinyl easters, polyolefins, such as polybutylene and polyethylene; polyvinyls such as poly(vinyl formate), poly(vinylbenzoate), poly(vinyl-carbazole), poly(vinylmethylketone), poly(vinylmethyl ether), polyvinyl acetate, polyvinyl butyral, and poly(vinyl formal); and polyolefinic elastomers.

Preferred adhesives are polydienes such as polybutadiene, polychloroprene and polysioprene; olefinic and copolymers such as ethylene-propylene, ethylene-chloropylene-diene copolymers, isobutylene-soprene copolymer, and chlorosulfonated polyethylene; natural rubber, polyfulfides, polyurethane elastomers; polyacrylates; polyethers; fluoroelastomer; unsaturated polyesters; vinyl esters; alkyds; flexible epoxy, flexible polyamides; epichlorophydrin; polyvinyls; flexible phenolics; silcon eleastomers; thermoplastic elastomers; copolymers of ethylene, polyvinyl formal, polyvinyl butyal; and poly(bis-maleimide). Blends of any combination of one or more of the above-mentioned adhesive materials. Most preferred adhesives are polybutadiene, polyisoprene, natural rubber, ethylene-propylene copolymers, ethylene-propylene-diene terpolymers, polysulfides, polyurethane elastomers, chlorosulfonated polyethylene, polychloroprene, poly(isobutyleneco-isoprene), polyacrylates, polyesters, vinyl esters, flexible epoxy, flexible nylon, silicone elastomers, copolymers of ethylene, polyvinyl formal, polyvinyl butyral, and blends of and combinations of two or more of the above-mentioned adhesive materials.

Planar bodies 18 are comprised of a rigid ballistic material which may vary widely depending on the uses of article 10, and may offer additional ballistic protection. The term "rigid" as used in the present specification and claims is intended to include semi-flexible and semi-rigid structures that are not capable of being free standing, without collapsing. The materials employed in the fabrication of planar bodies 18 may vary widely and may be metallic semi-metallic materials, an organic material and/or an inorganic material. Illustrative of such materials are those described in G. S. Brady and H. R. Clauser, *Materials Handbook*, 12th Ed. (1986). Materials useful for fabrication of planar bodies include the ceramic materials described herein above. Useful materials also include high modulus polymeric materials such as polyamides as for example aramids, nylon-66, nylon-6 and the like; polyester such as polyethylene terephthalate polybuylene terephthalate, and the like; acetalo; polysulfones; polyethersulfones; polyacrylates; acrylonitrile/butadiene/styrene copolymers; poly(amideimide); polycarbonates; polyphenylenesulfides; polyurethanes; polyphenyleneoxides; polyester carbonates polyesterimides; polymidies; polyetherimides; polymides; polyetheretherketone; epoxy resins; phenolic rasings; polysulfides; silicones; polyacrylates; polyacrylics; polydienes; cinyl ester resins, modified phenolic resins; unsaturated polyester; allylic resins; alkyd resins, melamine and unrea resins; polymer alloys and blends of thermoplastics and/or thermosets of the materials described above; and interpenetrating polymer networks such as those of polycyanate ester of a polyol such as the dicyanoester of bisphenol-A and a thermoplastic such as a polysulfone. These materials may be reinforced by high strength filaments described above for use in the fabrication of fibrous layer 14, such as aramid filaments, polyethylene filaments, boron filaments, glass filaments, ceramic filaments, carbon and graphite filaments, and the like.

Useful materials for the fabrication of planar bodies 22 also include multilayered fabric composites in which the fabric layers are secured together by some securing means as for example stitching, adhesive, staples, bolts and the like. These fabrics can be woven or non-woven and can be formed from the high strength filaments described above for use in the fabrication of fibrous layer 14, such as aramid filaments, polyethylene filaments and combinations thereof.

Useful materials for fabrication of bodies 22 also include metals such as nickel, manganese, tungsten, magnesium, titanium, aluminum and steel plate. Illustrative of useful steels are carbon steels which include mild steels of grades AISI 1005 to AISI 1030, medium-carbon steels of grades AISI 1030 to AISI 1055, high-carbon steels of the grades AISI 1060 to AISI 1095, free-machining steels, low-temperature carbon steels, rail steel, and superplastic steels; high-speed steels such as tungsten steels, molybdenum steels, chromium steels, vanadium steels, and cobalt steels; hot-die steels; low-alloy steels; low-expansion alloys; mold-steel; nitriding steels for example those composed of low- and medium-carbon steels in combination with chromium and aluminum, or nickel, chromium and aluminum; silicon steel such as transformer steel and silicon-manganese steel; ultra high-strength steels such as medium-carbon low alloy steels, chromium-molybdenum steel, chromium-nickel-molybdenum steel, iron-chromium-molybdenum-cobalt steel, quenched-and-tempered steels, cold-worked high-carbon steel; and stainless steels such as iron-chromium alloys austenitic steels, and chromium-nickel austenitic stainless steels, and chromiul-manganese steel. Useful materials also include alloys such a manganese alloys, such as manganes aluminum alloy, manganese bronze alloy; nickel alloys such as, nickel bronze, nickel cast iron alloy nickel-chromium alloys, nickel-chromium steel alloys, nickel copper alloys, nickel-molybdenum iron alloys, nickel-molybdenum steel alloys, nickel-silver alloys, nickel-steel alloys; iron-chromium-molybdenum-cobalt-steel alloys; magnesium alloys; aluminum alloys such as those of aluminum alloy 1000 series of commercially pure aluminum, aluminum-manganese alloys of aluminum alloy 300 series, aluminum-magnesium-manganese alloys, aluminum-magnesium alloys, aluminum-copper alloys, aluminum-silicon-magnesium alloys of 6000 series, aluminum-copper-chromium of 7000 series, aluminum casting alloys; aluminum brass alloys and aluminum bronze alloys.

One preferred configuration of planar bodies 22 are laminates in which one or more layers of filaments coated with a matrix material such as a polyolefin, polyamide, elastomer, polyurethane vinyl ester resin, polyester and the like (pre-molded if desired) are arranged in a sheet-like array and aligned parallel to one another along a common filament direction. Successive layers of such coated unidirectional filaments can be rotated with respect to the previous layer after which the laminate can be molded under heat and pressure to form the elminate. An example of such a layered vibration isolating layer is the layered structure in which the second, third, fourth and fifth layer are rotated 45°, 90° and 0° with respect to the first layer, but not necessarily in that order. Similarly, another example of such a layered body 18 is a layered structure in which the various unidirectional layers forming planar bodies 18 are aligned such that the common filament axis is adjacent layers is 0°, 90°.

The shape of planar bodies 22 may vary widely. For example, planar bodies 22 may be of regular shapes such as hexagonal, triangular, square, octagonal, trapezoidal, parallelogram and the like, or may be irregular shaped bodies of any shape or form. In the preferred embodiments of this invention, planar bodies 22 are regular shaped bodies, irregularly shaped bodies or combination thereof which completely or substantially completely (at least 90% area) cover the surface of fibrous layer 14 to be protected from penetration. Planar bodies 22 preferably cover at least about 95% area and more preferably at least about 98% area to about 99 or 100% area of the surface of fibrous layer 14 to be protected. In the more preferred embodiments of the invention, planar bodies 22 are of regular shape and in the most preferred embodiments of the invention planar bodies 22 are triangular (preferably right triangles, equilateral triangles or a combination thereof and more preferably equilateral triangles) shaped bodies as depicted in FIGS. 5 and 6 or a combination of triangular shaped bodies and hexagonal shaped bodies as depicted in FIGS. 12 and 13. Use of planar bodies 22 of these shapes provides for relative improved flexibility relative to ballistic article having planar bodies 22 of other shapes of equal area as shown in FIG. 14.

The apexes of planar bodies 22 are preferably truncated or rounded, which also enhance flexibility. In these embodiments, curvilinear planar bodies 22 (not depicted) such as circular or oval shaped bodies are preferably positioned at the truncated or rounded apexes to provide for additional penetration resistance. Alternatively, a mixture of totally or partially truncated planar bodies 18 and partially truncated or untruncated planar bodies 18 can be used in which the open areas at the truncated apexes can be covered by the untruncated apexes of the partially truncated or untruncated adjacent planar bodies 22 away from the boundary of the body. This enhances flexibility by allowing layers 12 to flex away from bodies 22. Additional flexibility can be achieved by providing spacers (not depicted) between layer 12 and planar bodies 22.

The articles of this invention can be fabricated using a number of procedures. In general, layers 12 are formed by molding the combination of polymeric layers and fibrous layers in the desired configurations and amounts by subjecting the combination to heat, and pressure during a mold cycle time. The molding temperature is critical and is usually selected such that it is less than the melting or softening point of the polymer from which the fibers of fibrous layer 14 are formed or the temperature at which fiber damage occurs, but is greater than the melting point or softening point of the polymer or polymers forming polymeric layer(s) 16. For example, for extended chain polyethylene filaments, molding temperatures range from about 20° to about 150° C., preferably from about 80° to about 145° C., more preferably from about 100° to about 135° C. The molding pressure may vary widely and preferably may range from about 10 psi (69 kPa) to about 10,000 psi (69,000 kPa). A pressure between. about 10 psi (69 kPa) to about 100 psi (690 kPa), when combined with temperatures below about 100° C. for a period of time less than about 1.0 min., may be used simply to cause the fibrous layers and polymeric layers to stick together. Pressures from about 100 psi to about 10,000 psi (69,000 kPa), when coupled with temperatures in the range of about 100 to about 155° C. for a time of between about 1 to about 5 min., may cause the filaments of the fibrous layers to deform and to compress together (generally in a film-like shape). Pressures from about 100 psi (690 kPa) to about 10,000 psi (69,000 kPa), when coupled with temperatures in the range of about 150° to about 155° C. for a time of between 1 to about 5 min., may cause the film to become translucent or transparent. For polypropylene filaments, the upper limitation of the temperature range is preferably about 10° to about 20° C. higher than for extended chain polyethylene filament and for aramid fibers, the upper limitation of the temperature range is preferably about 20° C. to about 30° C. higher than for extended chain polyethylene fibers.

The number of layers 12 included in article 10 of this invention may vary widely depending on the uses of the composite. For example, for those used where article 10 would be used as ballistic protection, the number of layers 12 would depend on a number of factors including the degree of ballistic protection desired and other factors known to those of skill in the ballistic protection art. In general for this application, the greater the degree of protection desired the greater the number of layers 12 included in article 10 for a given weight of the article. Conversely, the lesser the degree of ballistic protection required, the lesser the number of layers 12 required for a given weight of article 10.

As depicted in the Figures, article 10 preferably includes at least two layers 12 in which each layer 12 is partially covered with planar bodies 18, preferably forming an alternating pattern of covered and uncovered areas. These layers are positioned in article 10 such that the uncovered areas of one layer 12 are aligned with the covered areas of another layer 12 (preferably an adjacent layer) providing for partial or complete coverage of the uncovered areas of one layer 12 by the covered areas of an another layer 12. Alternatively, another preferred embodiment includes a layer 12 in which each side of the layer is partially covered with bodies 18 where the bodies are positioned such that the covered areas on one side of the layer are aligned with the uncovered areas on the other side of the layer. In the preferred embodiments of the invention the surface of layer 12 covered with planar body 16 such that the bodies are is uniformly larger than the uncovered mated surface of the other layer 12 providing for complete overlap. This is preferably accomplished by truncation of the edges of the bodies 18 or otherwise modification of such edges to allow for closer placement of bodies 18 on the surface of layers 12 such that a covered area is larger than the complimentary uncovered area.

The composites of this invention can be used for conventional purposes. For example, such composites can be used in the fabrication of penetration resistance articles and the like using conventional methods. For example, such penetration resistant articles include meat cutter aprons, protective gloves, boots, tents, fishing gear and the like.

The articles are particularly useful as a "bulletproof" vest material or ballistic resistant articles such as "bulletproof" lining for example, or a raincoat because of the flexibility of the article and its enhanced ballistic resistance.

In ballistic studies, the specific weight of the shells and plates can be expressed in terms of the areal density (ADT). This areal density corresponds to the weight per unit area of the ballistic resistant armor. In the case of filament reinforced composites, the ballistic resistance of which depends mostly on filaments, another useful weight characteristic is the filament areal density of the composite. This term corresponds to the weight of the filament reinforcement per unit area of the composite (AD).

The following examples are presented to provide a more complete understanding of the invention and are not to be construed as limitations thereon.

EXAMPLE 1

BALLISTIC PERFORMANCE OF UNMODIFIED FABRIC

Fabric targets, 43 cm square, consisting of Kevlar® 29 fabric layers were evaluated ballistically against bullets. The fabric was plain weave, 31×31 yarns per inch (12.2×12.2 yarns per cm.) woven from 1000 denier yarn by Clark-Schwebel and designated style 713. The targets were placed against a clay backing for testing. Both the clay backing and the bullets conformed to the national Institute of Justice Standard, NIJ Standard 0101.02. The results of firing bullets at targets at an angle of incidence of 60 degrees (angle between line of flight and the normal to the strike-face surface) are shown in Table 1. At an areal density as high as 5.40 kg/m², 50% of the bullets penetrated the target.

TABLE 1

BALLISTIC EVALUATION OF UNMODIFIED FABRIC
AGAINST BULLETS - ANGLE OF INCIDENCE 60 DEGREES

| No. of Fabric Layers | AD (kg/m²) | Striking Velocity ft./S (m/S) | Penetration |
|---|---|---|---|
| 18 | 4.86 | 1133 (345.3) | NO |
| 18 | 4.86 | 1111 (338.6) | YES |
| 20 | 5.40 | 1118 (340.8) | NO |
| 20 | 5.40 | 1126 (343.2) | YES |
| 22 | 5.94 | 1128 (343.8) | NO |
| 22 | 5.94 | 1101 (335.6) | NO |

EXAMPLE 2

PREPARATION AND BALLISTIC PERFORMANCE OF MODIFIED FABRIC

Each fabric layer of the fabric described in Example 1 was laminated to a layer of Caprolan® Nylon 6 film. Five fabric layers at a time, separated by release layers, were laminated for 10 minutes in a hydraulic press between platens heated to 220° C. at a pressure of 48 kPa. The ballistic characteristics of the laminated layers were evaluated by the procedure of Example 1. Laminate characteristics and the results of the evaluation are set forth in Table 2.

TABLE 2

BALLISTIC EVALUATION OF LAMINATED FABRIC
AGAINST BULLETS - ANGLE OF INCIDENCE 60 DEGREES

| No. of Fabric Layers | AD (kg/m) | ADT (kg/m²) | Striking Velocity (ft./S) (m/s) |
|---|---|---|---|
| (A) FILM ON IMPACT SIDE | | | |
| 19 | 5.13 | 5.44 | 1125 (342.9) |
| 12 | 3.24 | 3.43 | 1125 (351.1) |
| (B) FILM ON REMOTE SIDE | | | |
| 13 | 3.51 | 3.72 | 1097 (334.4) |
| 12 | 3.24 | 3.43 | 1063 (324.0) |
| 12 | 3.24 | 3.43 | 1079 (328.8) |
| 12 | 3.24 | 3.43 | 1178 (359.1) |
| 12 | 3.24 | 3.43 | 1181 (360.0) |
| 12 | 3.24 | 3.43 | 1093 (333.1) |

| No. of Fabric Layers | Penetration |
|---|---|
| 19 | NO |
| 12 | NO |
| 13 | NO |
| 12 | NO |
| 12 | NO |
| 12 | NO |
| 12 | YES |
| 12 | YES |

As can be seen from the results shown in Table 2, ballistic protection was improved, laminated fabrics at total areal density, ADT, of 3.43 kg/m² providing superior protection to that to unmodified fabric at a fabric areal density, AD, of 5.40 kg/m².

EXAMPLE 3

COMPARATIVE RESULTS ON FLEXIBILITY OF STRUCTURES

A simple drape test, Drape Test 1, in which 30 cm square samples were tested by hanging the sample over the straight edge of a horizontal flat plane, was carried out as shown in FIG. 5 to determine the labelled parameters. Sample descriptions are given in Table 3 and results are shown in Table 4.

A second drape test, Drape Test 2, was also carried out in which the test sample was turned at a 45 degree angle to that used for Drape Test 1 and similar parameters were determined and are given in table 5. (Distances were measured from center of overhang diagonal to the apex of the overhanging triangle.)

The drape test indicates the discontinuous laminates are highly flexible, with the triangular laminates having the greatest flexibility.

TABLE 3

| Sample No. | Configuration | Description |
|---|---|---|
| C1 | F + S | control-continuous separate sheets |
| 1 | F − S | one fabric layer |

TABLE 3-continued

| Sample No. | Configuration | Description |
|---|---|---|
| 2 | S – F – S | laminated to one 0°/90° SPECTRA-SHIELD ® panel one continuous fabric layer laminated between two continuous SPECTRA-SHIELD ® panels |
| 3 | F – S – F | one continuous SPECTRA-SHIELD ® panels laminated between two continuous fabric layers |
| 4 | F – S | Similar to Sample 1, except S cut into three inch squares |
| 5 | F – S | Similar to Sample 1, except S cut into two inch squares |
| 6 | F – S | Similar to Sample 4, except S cut along diagonals to product four right angle triangles from each square |

F - plain weave SPECTRA ® 1000 FABRIC having 34 × 34 yarns/in. from 650 denier yarn, AD equal to 0.024 kg./m² obtained from Allied-Signal Inc.
S - 0°/90° SPECTRA-SHIELD ® LAMINATE having AD equal to 0.104 kg/m² and ADT equal to 0.131 kg./m² obtained from Allied Signal Inc.
LAMINATION - hydraulic press, platens 130° C., force 30 tons (30,480 kg) for 30 minutes.

TABLE 4

DRAPE TEST 1

| Sample No. | Bottom Layer* | D (cm) | V (cm) | H (cm) | V/D |
|---|---|---|---|---|---|
| C1 | S | 20 | 15.2 | 11.8 | 0.76 |
| 1 | F | 20 | 6 | 19 | 0.30 |
| 2 | — | 20 | 1 | 20 | 0.05 |
| 3 | — | 20 | 5 | 19 | 0.25 |
| 4 | F | 23.5 | 23.4 | 2.0 | 0.996 |
| 5 | F | 26.8 | 26.5 | 2.0 | 0.989 |
| 6 | F | 23.0 | 22.5 | 2.0 | 0.978 |

*Designated for unsymmetrical samples.

TABLE 5

DRAPE TEST 2

| Sample No. | Bottom Layer* | D (cm) | V (cm) | H (cm) | V/D |
|---|---|---|---|---|---|
| C1 | S | 20.5 | 18 | 9.5 | 0.88 |
| 1 | F | 21.5 | 3 | 21 | 0.14 |
| 2 | — | 21.5 | 0 | 21.5 | 0 |
| 3 | — | 21.5 | 2 | 21.3 | 0.09 |
| 4 | F | 22.0 | 17.2 | 13.7 | 0.78 |
| 5 | F | 23.0 | 14.0 | 16.2 | 0.60 |
| 6 | F | 21.7 | 21.3 | 2.0 | 0.98 |

*Designated for unsymmetrical samples.

EXAMPLE 4

PENETRATION RESISTANCE

The penetration resistance of certain of the samples evaluated in EXAMPLE 3 was determined using a small diameter (2.67 mm–0.105 in.) and large diameter (3.86 mm–0.152 in.) probe. The probes were cylindrical with pointed impact end (included angle for points was 53 degrees). A servo-hydraulic Instron test apparatus designated high velocity loading was used to provide an impacting velocity of approximately 12 ft./S (3.66 m/S). Samples were held between two flat circular rings having an inside diameter of 3 inches (7.6 cm). Results, shown in Table 6 and 7, indicate that lamination increases resistance to penetration.

TABLE 6

(A) PENETRATION RESISTANCE AGAINST SMALL PROBE

| Sample No. | Impact Side | Peak Force lb. (kg) |
|---|---|---|
| C1 | F | 22.8 (10.35) |
| 1 | F | 34.8 (15.80) |
| 4 | F | 31.7 (14.39) |

TABLE 7

(B) PENETRATION RESISTANCE AGAINST LARGE PROBE

| Sample No. | Impact Side | Peak Force lb. (kg) |
|---|---|---|
| C1 | F | 37.9 (17.2) |
| 1 | F | 52.9 (24.0) |

EXAMPLE 5

FLEXIBLE STRUCTURES BASED ON EQUILATERAL TRIANGLES

Panels were molded from parallel fiber webs. (SPECTRA® 1000 fiber 80 wt 5, KRATON® D1107 20 wt. 5) by plying 10 parallel fiber webs together with fiber direction at right angles to that of the previous layer and molding the panels at 130° C. for 10 minutes at a pressure of 208 psi (1430 kPa). Panel AD was equal to 1.15 kg/m² and ADT was equal to 1.35 kg/m². Two different types of triangles, having identical areas, were cut from the panels:

A. Equilateral triangle, having a side length 2.3 in (5.8 cm); and

B. Right angle (45°/45°/90°), having a hypotenuse length 3 in. (7.6 cm)

These triangles were laminated onto SPECTRA® 1000 plain weave fabric (34×34 yarns per in., (13.4 yarns/cm.) of 650 denier yarn, AD was equal to 0.26 kg/m², with alternate triangles on opposite sides of the fabric as illustrated FIGS. 6 and 7 to form one ft. square (each side is 0.305 m) structures. (Lamination conditions were 130° C. for 10 minutes at a pressure of 70 psi (480 kPa)).

Figure 8:
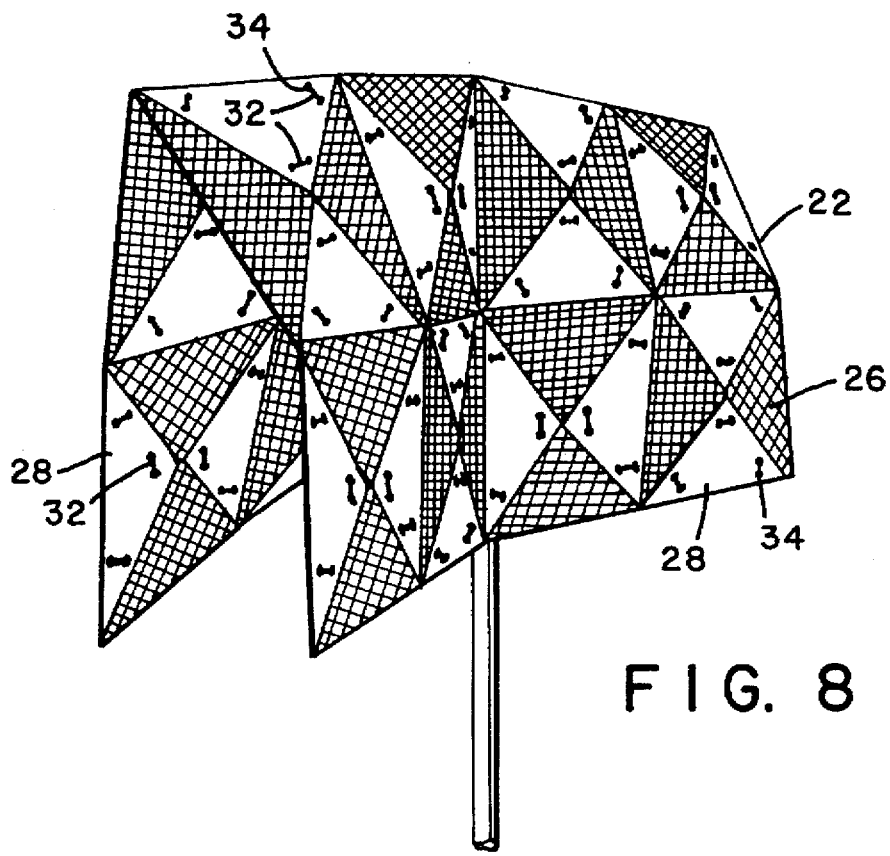
FIG. 8 is a sideview of the construction depicted in FIG. 6.
Figure 9:
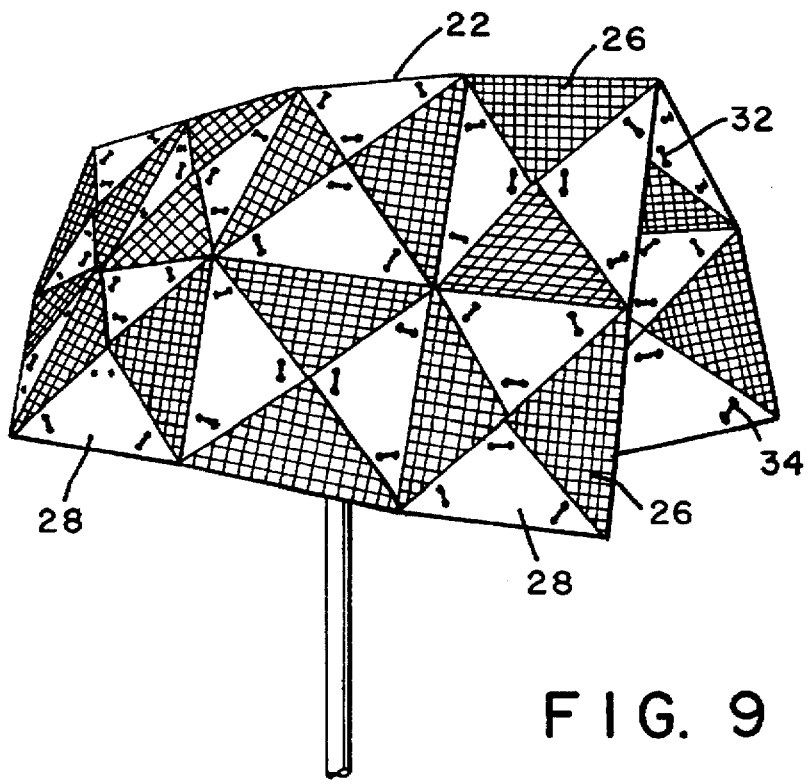
FIG. 9 is a sideview of the construction depicted in FIG. 6, where the viewing direction is 90° from that of FIG. 8.
Figure 10:
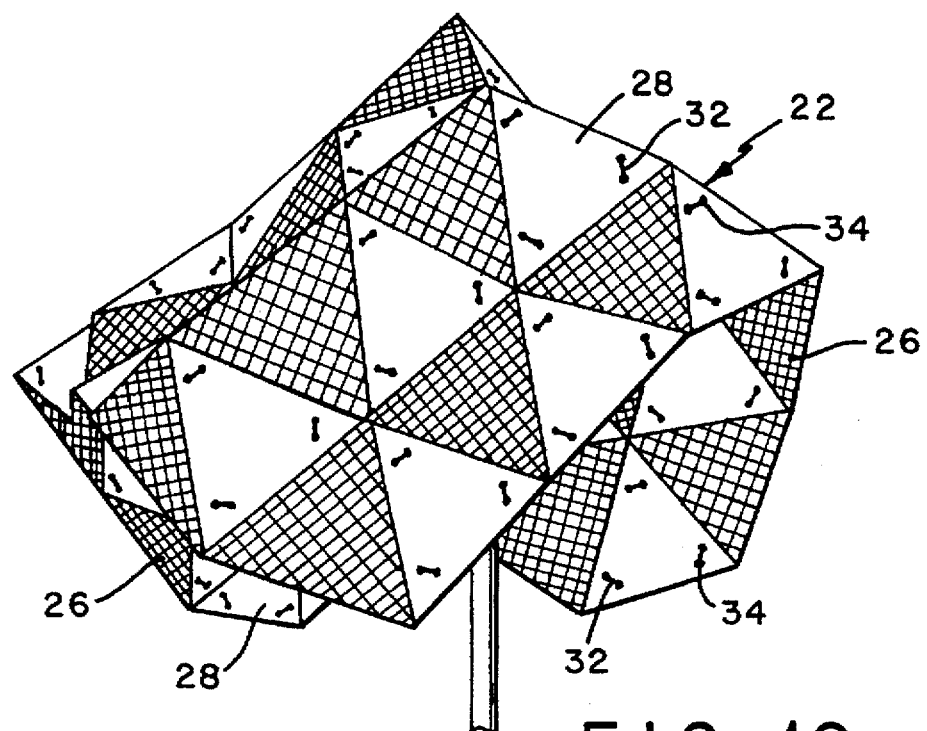
FIG. 10 is a sideview of the construction depicted in FIG. 7.
Figure 11:
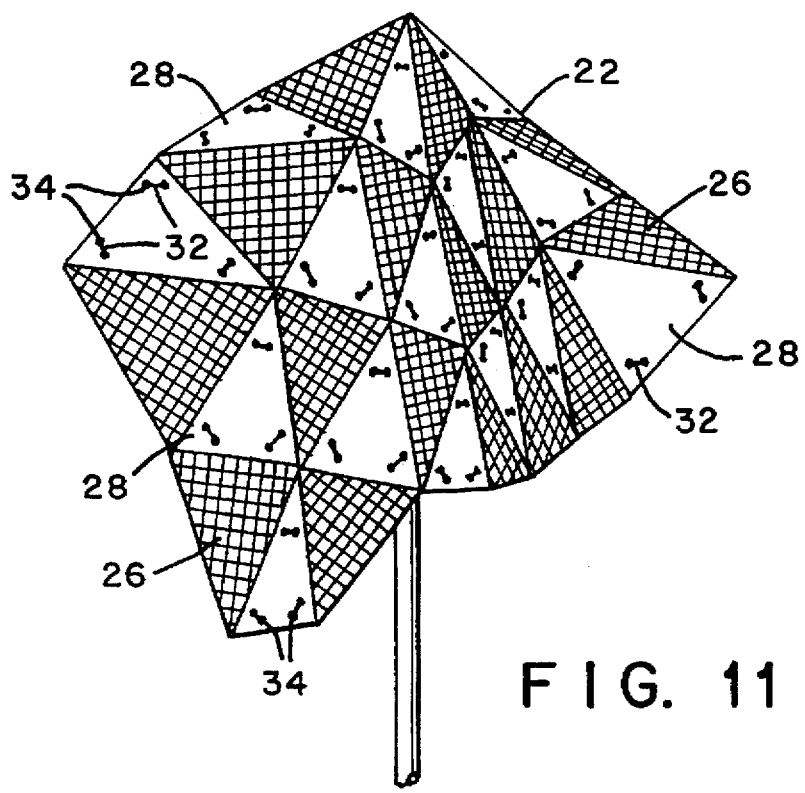
FIG. 11 is a sideview of the construction depicted in FIG. 7 where the viewing direction is 90° from that of FIG. 10

The flexibility of the two structures was determined by supporting the structure on vertical post 12.7 mm in diameter. As can be seen in FIGS. 8 and 9 the structure constructed from the right angle triangle folded along one axis and very little bending occurs at right angles to this axis. In contrast to this, the structure constructed from equilateral triangles bends in a more uniform manner. (See FIGS. 10 and 11). FIGS. 8, 9, 10 and 11 are line drawings prepared from copying actual photographs.

Examination of the two constructions indicates that the one from equilateral triangles is more easily bent around a doubly curved surface and can be expected to more readily conform to and accommodate body contours and movement.

EXAMPLE 6

A. TARGET CONSTRUCTION

A 24"×24" (61 cm×61 cm) strike-face was prepared by laminating a number of equilateral composite triangles, having triangle sides 3" (7.6 cm) long. Each composite triangle was cut from a panel prepared by molding 17 panels (0°/90° laminates) together. The laminates were 80 wt. % SPECTRA® fiber and 20 wt. % polyethylene matrix) The ADT of the strike face was 2.33 kg/m² for panels. The triangular strike faces were taped onto the front panel (using double sided adhesive tape) of 13 layers of commercial SPECTRA-SHIELD® sheet (ADT 1.95 kg/m₂) yielding a target having ADT 4.28 kg/m₂ and designated TARGET A.

The results from this target were compared with those of 30 layers of commercial SPECTRA-SHIELD® sheet, having an ADT 4.50 kg/$_{m2}$, as a designated CONTROL.

B. BALLISTIC EVALUATION

Targets were evaluated against clay backing, according to National Institute of Justice Standard NIJ 0101.03 against selected bullets. Shots were fired into a central area of the triangular strike-faces.

Results from evaluation of the CONTROL sample indicated that 19 shots having an average velocity of 1507.7 ft/S (459.5 m/sec) penetrated the target (individual shot velocities were 1506 ft/sec (m/sec), 1490 ft/sec (454.2 m/sec), 1500 ft/sec (457.2 m/sec), 1494 ft/sec (455.4 m/sec), 1510 ft/sec (460.2 m/sec), 1494 ft/sec (455.4 m/sec), 1520 ft/sec (463.3 m/sec), 1448 ft/sec (441.4 m/sec), 1506 ft/sec (459.0 m/sec), 1490 ft/sec (459.2 m/sec), 1475 ft/sec (449.6 m/sec), 1494 ft/sec (455.4 m/sec), 1510 ft/sec (460.2 m/sec), 1516 ft/sec (462.1 m/sec), 1514 ft/sec (0.461.5 m/sec), 1533 ft/sec (467.3 m/sec), 1536 ft/sec (468.2 m/sec), 1526 ft/sec (465.1 m/sec), 1558 ft/sec (474.8 m/sec), and 1500 ft/sec ft/S (457.2 m/sec) and 13 shots, having an average striking velocity of 1505.5 ft./S (458.8) m/sec, did not penetrate the target (individual velocities were 1530 ft/sec (466.3 m/sec), 1493 ft/sec (455.1 m/sec), 1478 ft/sec (450.5 m/sec), 1484 ft/sec (452.3 m/sec), 1495 ft/sec (455.6 m/sec), 1532 ft/sec (467.6 m/sec), 1508 ft/sec (459.6 m/sec), 1488 ft/sec (453.5 m/sec), 1505 ft/sec (458.7 m/sec), 1513 ft/sec (461.2 m/sec), 1512 ft/sec (460.9 m/sec), 1520 ft/sec (463.3 m/sec), and 1514 ft/sec (461.5 m/sec). This target stopped penetration of only 41% of the impacting shots.

TARGET A was evaluated in an identical manner and five of the impacting shots penetrated having an average velocity of 1502 ft/sec (457.8 m/sec) (individual shot velocities were: 1486 ft/sec (452.9 m/sec), 1504 ft/sec (458.4 m/sec), 1502 ft/sec (457.8 m/sec), 1512 ft/sec (460.9 m/sec), and 1506 ft/sec (459.0 m/sec), and 19 shots having an average velocity of 1495 ft/sec (455.7 m/sec) were stopped (individual velocities were 1480 ft/sec (451.1 m/sec), 1475 ft/sec (449.6 m/sec), 1514 ft/sec (461.5 m/sec), 1500 ft/sec (457.2 m/sec), 1492 ft/sec (454.8 m/sec), 1478 ft/sec (450.5 m/sec), 1492 ft/sec (454.8 m/sec), 1488 ft/sec (453.5 m/sec), 1515 ft/sec (461.8 m/sec), 1494 ft/sec (455.4 m/sec), 1532 ft/sec (467.0 m/sec), 1485 ft/sec (452.6 m/sec), 1481 ft/sec (451.4 m/sec), 1468 ft/sec (447.4 m/sec), 1482 ft/sec (451.7 m/sec), 1508 ft/sec (459.6 m/sec), 1500 ft/sec (457.2 m/sec), 1518 ft/sec (462.7 m/sec), and 1508 ft/sec (459.6 m/sec)—This target stopped approximately twice the fraction of shots as the control at a slightly lower areal density.

What is claimed is:

1. A flexible penetration resistant composite comprising
   a. at least one fibrous layer comprised of a network of fibers, a portion of said fibers having a tenacity equal to or greater than about 10 g/d, a tensile modulus equal to or greater than about 150 g/d and an energy-to-break equal to or greater than about 10 j/g; and
   b. at least one continuous polymeric layer comprised of a thermoplastic resin, a thermosetting resin or a combination thereof, said continuous polymeric layer coextensive with, in contact with and at least partially bound to a surface of one of said fibrous layers.

2. A composite as recited in claim 1 wherein said tenacity is equal to or greater than about 20 g/d, said modulus is equal to or greater than about 500 g/d, and said energy-to-break is equal to or greater than about 15 j/g.

3. A composite as recited in claim 2 wherein said tenacity is equal to or greater than about 25 g/d, said modulus is equal to or greater than about 1000 g/d, and said energy-to-break is equal to or greater than about 20 j/g.

4. A composite as recited in claim 2 wherein said tenacity is equal to or greater than about 30 g/d, said modulus is equal to or greater than about 1300 g/d, and said energy-to-break is equal to or greater than about 30 j/g.

5. A composite as recited in claim 1 wherein said fibers are polyethylene fibers, nylon fibers, aramid fibers or mixtures thereof.

6. A composite as recited in claim 5 wherein said fibers are polyethylene fibers.

7. A composite as recited in claim 5 wherein said fibers are aramid fibers.

8. A composite as recited in claim 1 wherein said fibrous layer comprises at least one sheet-like fiber array in which said fibers are arranged substantially parallel to one another along a common fiber direction.

9. A composite as recited in claim 8 wherein said fibrous layer comprises more than one array, with adjacent arrays aligned at an angle with respect to the longitudinal axis of the parallel fibers contained in said adjacent array.

10. A composite as recited in claim 9 wherein said angle is from about 45° to about 90°.

11. A composite as recited in claim 10 wherein said angle is about 90°.

12. A composite as recited in claim 1 wherein said fibrous layers comprises a non-woven fabric.

13. A composite as recited in claim 1 wherein said fibrous layer comprises a woven fabric.

14. A composite as recited in claim 1 wherein said polymeric layer comprises fibrous network in a polymer matrix.

15. A composite as recited in claim 14 wherein said fibrous network comprises a sheet-like fiber array in which said fibers are arranged substantially parallel to one another along a common fiber direction.

16. A composite as recited in claim 15 wherein said network comprises a plurality of sheet-like fiber arrays in which adjacent arrays are aligned at an angle with respect in the common fiber direction of the parallel fibers contained in said arrays.

17. A composite as recited in claim 16 wherein said angle is from about 45° to about 90°.

18. A composite as recited in claim 17 wherein said angle is about 90°.

19. The composite of claim 1 wherein said continuous polymeric layer comprises a film.

20. The composite of claim 19 wherein said film is laminated to the surface of the fibrous layer.

21. The composite of claim 1 which further comprises a rigid layer comprising a plurality of discontinuous planar bodies laminated, or laminated and sewn, to said fibrous layer, said polymeric layer or a combination thereof.

22. The composite of claim 21 wherein said planar bodies are of a shape and are positioned such that more than one semi-continuous or continuous seam is formed in which seam directions are at an angle, said composite being flexible along each seam direction.

23. The composite of claim 22 where said seams are continuous.

24. The composite of claim 23 wherein said planar bodies are of a shape and are positioned such that at least two seams are formed.

25. The composite of claim 22 wherein said planar bodies are in the shape of equilateral triangles and hexagons.

26. The composite of claim 25 wherein the apexes of said planar bodies are truncated.

27. The composite of claim 26 which further comprises additional curvilinear planar bodies positioned at the truncated apexes of said planar bodies.

28. The composite of claim 24 wherein at least three seams are formed, and in which the direction of each seam is at a 60° angle with respect to the direction of at least one other seam.

29. The composite of claim 21 wherein said rigid layer is formed from a metal, ceramic, a polymeric composite, multilayered fibrous composite or a combination thereof.

30. The composite of claim 21 wherein said rigid layer comprises a polymeric composite, which comprises a fibrous network of inorganic fibers, organic fibers or a combination thereof in a matrix.

31. The composite of claim 30 wherein said fibrous layer comprises aramid fibers, glass fibers, polyethylene fibers or a combination thereof.

32. The composite of claim 31 wherein said fibrous network comprises one or more sheet-like fiber arrays in which the fibers in each array are arranged substantially parallel to one another along a common fiber direction.

33. The composite of claim 32 wherein said fibrous network comprises more than one fiber array, with adjacent arrays aligned at an angle with respect to the longitudinal axis of the parallel fibers contained in said arrays.

34. The composite of claim 33 wherein said angle is from about 45° to about 90°.

35. The composite of claim 33 wherein said angle is about 90°.

36. The composite of claim 21 wherein said rigid layer is a multilayered fabric composite wherein all or a portion of said fabric layers are secured together.

37. The composite of claim 36 wherein said fabric is formed from aramid fibers, polyethylene fibers or a combination thereof.

38. The composite of claim 21 wherein said planar bodies are substantially of equilateral triangular shape or a combination of planar bodies substantially of hexagonal and equilateral triangular shape.

39. The composite of claim 38 wherein the apexes of said planar bodies are truncated.

40. The composite as recited in claim 39 which further comprises additional curvilinear planar bodies positioned at the truncated apexes of said planar bodies.

41. An article comprising the flexible, penetration resistant composite of claim 1.

42. An article comprising the flexible, penetration resistant composite of claim 19.

43. A flexible penetration resistant composite comprising
a. at least one fibrous layer comprised of a network of fibers, a portion of said fibers having a tenacity equal to or greater than about 10 g/d, a tensile modulus equal to or greater than about 150 g/d and an energy to break equal to or greater than about 10 j/g, and
b. a plurality of discontinuous polymeric layers, each of said discontinuous polymeric layers being comprised of a thermoplastic resin, a thermosetting resin or a combination thereof, each of said discontinuous polymeric layers being in contact with and at least partially bound to a surface of one of said fibrous layers, said discontinuous polymeric layers completely covering a surface area equivalent to the surface of one of said fibrous layers when superimposed.

44. An article comprising the composite of claim 43.

45. The composite of claim 43 wherein said polymeric layer comprises a plurality of regular shaped potions.

46. The composite of claim 45 wherein all or a portion of each of said discontinuous polymeric layers is shaped such that more than one semi-continuous or continuous seams are formed in which seam directions are at an angle.

47. The composite of claim 46 wherein said seams are continuous.

48. The composite of claim 47 wherein each of said polymeric layers is such that three seams are formed wherein seam directions intersect at an angle.

49. The composite of claim 48 wherein at least three seams are formed and in which direction of each is at a 60° angle with respect to the direction of at least one other seam.

50. The composite of claim 48 wherein said tenacity is equal to or greater than about 20 g/d, said modulus is equal to or greater than about 500 g/d, and said energy-to-break is equal to or greater than about 15 j/g.

51. The composite of claim 43 wherein said tenacity is equal to or greater than about 25 g/d, said modulus is equal to or greater than about 1000 g/d, and said energy-to-break is equal to or greater than about 20 j/g.

52. The composite of claim 43 wherein said tenacity is equal to or greater than about 30 g/d, said modulus is equal to or greater than about 1300 g/d, and said energy-to-break is equal to or greater than about 30 j/g.

53. The composite of claim 43 wherein said fibers are polyethylene fibers, aramid fibers or mixtures thereof.

54. The composite of claim 43 wherein said fibers are polyethylene fibers.

55. The composite of claim 43 wherein said fibers are aramid fibers.

56. The composite of claim 43 wherein said fibrous layer comprises at least one sheet-like fiber array in which said fibers are arranged substantially parallel to one another along a common fiber direction.

57. The composite of claim 56 wherein said fibrous layer comprises more than one array, with adjacent arrays aligned at an angle with respect to the longitudinal axis of the parallel fibers contained in said adjacent array.

58. The composite of claim 57 wherein said angle is from about 45° to about 90°.

59. The composite of claim 58 wherein said angle is about 90°.

60. The composite of claim 43 wherein said fibrous layer comprises a non-woven fabric.

61. The composite of claim 43 wherein said fibrous layer comprises a woven fabric.

62. The composite of claim 43 wherein each of said polymeric layers comprises a fibrous network in a polymer matrix.

63. The composite of claim 43 which further comprises a rigid layer comprising a plurality of discontinuous planar bodies laminated, or laminated and sewn, to said fibrous layer, said polymeric layer or a combination thereof.

64. An article comprising the composite of claim 62.

65. A composite as recited in claim 43 wherein said discontinuous polymeric layers each comprise a plurality of regular shaped portions.

66. A composite as recited in claim 65 wherein said polymeric layer includes two or more seams are formed in which same directions are non-parallel and wherein said article can be flexed along said seams.

67. A composite as recited in claim 66 wherein said seam are continuous.

68. A composite as recited in claim 67 wherein said layer is such that two or three seams are formed wherein seam directions intersect at an angle.

69. A composite as recited in claim 68 wherein said layer is such that three seams are formed wherein seam directions intersect at an angle.

70. A composite as recited in claim 69 wherein at least three seams are formed in which directions of each seam is a 60° angle with respect to the direction of at least one other seam.

* * * * *